(12) United States Patent
Streit

(10) Patent No.: US 11,783,018 B2
(45) Date of Patent: *Oct. 10, 2023

(54) BIOMETRIC AUTHENTICATION

(71) Applicant: Private Identity LLC, Potomac, MD (US)

(72) Inventor: Scott Edward Streit, Woodbine, MD (US)

(73) Assignee: Private Identity LLC, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,400

(22) Filed: Nov. 8, 2021

(65) Prior Publication Data

US 2022/0058255 A1    Feb. 24, 2022

Related U.S. Application Data

(63) Continuation of application No. 16/022,101, filed on Jun. 28, 2018, now Pat. No. 11,170,084.

(51) Int. Cl.
*G06F 21/32*      (2013.01)

(52) U.S. Cl.
CPC ...... *G06F 21/32* (2013.01); *G06F 2221/2133* (2013.01)

(58) Field of Classification Search
CPC ............ G06F 21/32; G06F 2221/2133; G06F 21/316; H04L 63/102; H04L 63/0861
See application file for complete search history.

(56) References Cited

U.S. PATENT DOCUMENTS

| | | |
|---|---|---|
| 5,408,588 A | 4/1995 | Ulug |
| 5,805,731 A | 9/1998 | Yaeger et al. |

(Continued)

FOREIGN PATENT DOCUMENTS

| | | |
|---|---|---|
| EP | 2 784 710 B1 | 6/2018 |
| WO | WO 2019/200264 A1 | 10/2019 |

OTHER PUBLICATIONS

Invitation to Pay Additional Fees dated Jun. 24, 2019, in connection with International Application No. PCT/US2019/021100.

(Continued)

*Primary Examiner* — Khalid M Almaghayreh
(74) *Attorney, Agent, or Firm* — Wolf, Greenfield & Sacks, P.C.

(57) ABSTRACT

Systems and methods of authorizing access to access-controlled environments are provided. In one example, a method includes receiving, passively by a computing device, user behavior authentication information indicative of a behavior of a user of the computing device, comparing, by the computing device, the user behavior authentication information to a stored user identifier associated with the user, calculating, by the computing device, a user identity probability based on the comparison of the user behavior authentication information to the stored user identifier, receiving, by the computing device, a request from the user to execute an access-controlled function, and granting, by the computing device, the request from the user responsive to determining that the user identity probability satisfies a first identity probability threshold associated with the access-controlled function.

22 Claims, 8 Drawing Sheets

(56) References Cited

U.S. PATENT DOCUMENTS

| | | | |
|---|---|---|---|
| 5,838,812 A * | 11/1998 | Pare, Jr. | G06F 21/554 |
| | | | 382/181 |
| 6,480,621 B1 | 11/2002 | Lyon | |
| 6,944,319 B1 | 9/2005 | Huang et al. | |
| 7,278,025 B2 * | 10/2007 | Saito | H04L 9/3231 |
| | | | 713/185 |
| 8,281,148 B2 | 10/2012 | Tuyls et al. | |
| 8,856,541 B1 | 10/2014 | Chaudhury et al. | |
| 8,966,277 B2 | 2/2015 | Rane et al. | |
| 9,003,196 B2 | 4/2015 | Hoyos et al. | |
| 9,141,916 B1 | 9/2015 | Corrado et al. | |
| 9,208,492 B2 | 12/2015 | Hoyos | |
| 9,313,200 B2 | 4/2016 | Hoyos | |
| 9,390,327 B2 | 7/2016 | Gottemukkula et al. | |
| 9,426,150 B2 | 8/2016 | Stern et al. | |
| 9,471,919 B2 | 10/2016 | Hoyos et al. | |
| 9,619,723 B1 * | 4/2017 | Chow | G06V 40/45 |
| 9,783,162 B2 | 10/2017 | Hoyos et al. | |
| 9,838,388 B2 | 12/2017 | Mather et al. | |
| 10,075,289 B2 | 9/2018 | Laine et al. | |
| 10,108,902 B1 | 10/2018 | Lockett | |
| 10,110,738 B1 | 10/2018 | Sawant et al. | |
| 10,180,339 B1 | 1/2019 | Long et al. | |
| 10,419,221 B1 | 9/2019 | Streit | |
| 10,467,526 B1 | 11/2019 | Appalaraju et al. | |
| 10,491,373 B2 | 11/2019 | Jain et al. | |
| 10,499,069 B2 | 12/2019 | Wang et al. | |
| 10,721,070 B2 | 7/2020 | Streit | |
| 10,938,852 B1 | 3/2021 | Streit | |
| 11,112,078 B2 | 9/2021 | Jiang | |
| 11,138,333 B2 | 10/2021 | Streit | |
| 11,170,084 B2 | 11/2021 | Streit | |
| 11,210,375 B2 | 12/2021 | Streit | |
| 11,281,664 B1 | 3/2022 | Paiz | |
| 11,362,831 B2 | 6/2022 | Streit | |
| 11,392,802 B2 | 7/2022 | Streit | |
| 11,394,552 B2 | 7/2022 | Streit | |
| 11,489,866 B2 | 11/2022 | Streit | |
| 11,502,841 B2 | 11/2022 | Streit | |
| 11,562,255 B2 | 1/2023 | Johnson et al. | |
| 2002/0049685 A1 | 4/2002 | Yaginuma | |
| 2002/0104027 A1 * | 8/2002 | Skerpac | G07C 9/37 |
| | | | 726/28 |
| 2005/0138110 A1 | 6/2005 | Redlich et al. | |
| 2005/0149442 A1 | 7/2005 | Adams et al. | |
| 2006/0228005 A1 | 10/2006 | Matsugu et al. | |
| 2007/0155366 A1 * | 7/2007 | Manohar | H04M 1/2535 |
| | | | 455/410 |
| 2007/0177773 A1 | 8/2007 | Hu et al. | |
| 2007/0220595 A1 | 9/2007 | M'raihi et al. | |
| 2007/0245152 A1 * | 10/2007 | Pizano | H04L 63/0861 |
| | | | 713/186 |
| 2008/0113785 A1 | 5/2008 | Alderucci et al. | |
| 2008/0113786 A1 | 5/2008 | Alderucci et al. | |
| 2008/0247611 A1 | 10/2008 | Aisaka et al. | |
| 2009/0034803 A1 | 2/2009 | Matos | |
| 2009/0328175 A1 | 12/2009 | Shuster | |
| 2010/0131273 A1 | 5/2010 | Aley-Raz et al. | |
| 2010/0162386 A1 | 6/2010 | Li et al. | |
| 2010/0180127 A1 | 7/2010 | Li et al. | |
| 2011/0026781 A1 | 2/2011 | Osadchy et al. | |
| 2012/0195475 A1 | 8/2012 | Abiko | |
| 2013/0080166 A1 | 3/2013 | Buffum et al. | |
| 2013/0148868 A1 | 6/2013 | Troncoso Pastoriza et al. | |
| 2013/0166296 A1 | 6/2013 | Scheffer | |
| 2013/0212049 A1 | 8/2013 | Maldonado | |
| 2013/0307670 A1 * | 11/2013 | Ramaci | G07C 9/257 |
| | | | 340/5.82 |
| 2013/0318351 A1 | 11/2013 | Hirano et al. | |
| 2014/0279774 A1 | 9/2014 | Wang et al. | |
| 2014/0283061 A1 | 9/2014 | Quinlan et al. | |
| 2014/0304505 A1 | 10/2014 | Dawson | |
| 2014/0331059 A1 | 11/2014 | Rane et al. | |
| 2014/0337930 A1 * | 11/2014 | Hoyos | H04L 63/10 |
| | | | 726/4 |
| 2015/0170053 A1 | 6/2015 | Miao | |
| 2015/0310444 A1 * | 10/2015 | Chen | G06Q 20/308 |
| | | | 705/44 |
| 2015/0347820 A1 | 12/2015 | Yin et al. | |
| 2016/0078485 A1 | 3/2016 | Shim et al. | |
| 2016/0127359 A1 * | 5/2016 | Minter | H04L 63/0861 |
| | | | 726/6 |
| 2016/0164682 A1 | 6/2016 | Hartloff et al. | |
| 2016/0350648 A1 | 12/2016 | Gilad-Bachrach et al. | |
| 2016/0371438 A1 * | 12/2016 | Annulis | G06F 21/32 |
| 2016/0373440 A1 | 12/2016 | Mather et al. | |
| 2016/0379041 A1 | 12/2016 | Rhee et al. | |
| 2016/0379044 A1 | 12/2016 | Tang et al. | |
| 2017/0008168 A1 | 1/2017 | Weng et al. | |
| 2017/0046563 A1 | 2/2017 | Kim et al. | |
| 2017/0093851 A1 * | 3/2017 | Allen | H04L 9/3263 |
| 2017/0098140 A1 | 4/2017 | Wang et al. | |
| 2017/0126672 A1 * | 5/2017 | Jang | H04L 63/0492 |
| 2017/0132526 A1 | 5/2017 | Cohen et al. | |
| 2017/0169331 A1 | 6/2017 | Garner | |
| 2017/0289168 A1 | 10/2017 | Bar et al. | |
| 2017/0357890 A1 | 12/2017 | Kim et al. | |
| 2018/0018451 A1 | 1/2018 | Spizhevoy et al. | |
| 2018/0025243 A1 | 1/2018 | Chandraker et al. | |
| 2018/0060552 A1 | 3/2018 | Pellom et al. | |
| 2018/0082172 A1 | 3/2018 | Patel et al. | |
| 2018/0121710 A1 | 5/2018 | Leizerson et al. | |
| 2018/0137395 A1 | 5/2018 | Han et al. | |
| 2018/0139054 A1 | 5/2018 | Chu et al. | |
| 2018/0173861 A1 * | 6/2018 | Guidotti | G06F 21/45 |
| 2018/0173980 A1 | 6/2018 | Fan et al. | |
| 2018/0232508 A1 | 8/2018 | Kursun | |
| 2018/0276488 A1 | 9/2018 | Yoo et al. | |
| 2018/0293429 A1 | 10/2018 | Wechsler et al. | |
| 2018/0307815 A1 | 10/2018 | Samadani et al. | |
| 2018/0330179 A1 * | 11/2018 | Streit | G06N 3/08 |
| 2018/0336472 A1 | 11/2018 | Ravi | |
| 2018/0373979 A1 | 12/2018 | Wang et al. | |
| 2019/0005126 A1 | 1/2019 | Chen et al. | |
| 2019/0019061 A1 | 1/2019 | Trenholm et al. | |
| 2019/0020482 A1 | 1/2019 | Gupta et al. | |
| 2019/0042895 A1 | 2/2019 | Liang et al. | |
| 2019/0044723 A1 * | 2/2019 | Prakash | G06V 40/40 |
| 2019/0068627 A1 | 2/2019 | Thampy | |
| 2019/0080475 A1 | 3/2019 | Ma et al. | |
| 2019/0122096 A1 | 4/2019 | Husain | |
| 2019/0132344 A1 | 5/2019 | Lem et al. | |
| 2019/0147305 A1 | 5/2019 | Lu et al. | |
| 2019/0147434 A1 * | 5/2019 | Leung | H04L 63/0861 |
| | | | 705/41 |
| 2019/0171908 A1 | 6/2019 | Salavon | |
| 2019/0180090 A1 | 6/2019 | Jiang et al. | |
| 2019/0197331 A1 | 6/2019 | Kwak et al. | |
| 2019/0205620 A1 | 7/2019 | Yi et al. | |
| 2019/0215551 A1 | 7/2019 | Modarresi et al. | |
| 2019/0236273 A1 | 8/2019 | Saxe et al. | |
| 2019/0244138 A1 | 8/2019 | Bhowmick et al. | |
| 2019/0253404 A1 | 8/2019 | Briceno et al. | |
| 2019/0253431 A1 | 8/2019 | Atanda | |
| 2019/0278895 A1 * | 9/2019 | Streit | G06F 21/602 |
| 2019/0278937 A1 | 9/2019 | Streit | |
| 2019/0279047 A1 | 9/2019 | Streit | |
| 2019/0280868 A1 | 9/2019 | Streit | |
| 2019/0280869 A1 | 9/2019 | Streit | |
| 2019/0286950 A1 | 9/2019 | Kiapour et al. | |
| 2019/0294973 A1 | 9/2019 | Kannan et al. | |
| 2019/0295223 A1 | 9/2019 | Shen et al. | |
| 2019/0306731 A1 | 10/2019 | Raghuramu et al. | |
| 2019/0318261 A1 | 10/2019 | Deng et al. | |
| 2019/0347432 A1 | 11/2019 | Boivie | |
| 2019/0354806 A1 | 11/2019 | Chhabra | |
| 2019/0372754 A1 | 12/2019 | Gou et al. | |
| 2019/0372947 A1 | 12/2019 | Penar et al. | |
| 2020/0004939 A1 | 1/2020 | Streit | |
| 2020/0007931 A1 | 1/2020 | Ho et al. | |
| 2020/0014541 A1 | 1/2020 | Streit | |
| 2020/0044852 A1 | 2/2020 | Streit | |

(56) References Cited

U.S. PATENT DOCUMENTS

| | | | |
|---|---|---|---|
| 2020/0097653 A1 | 3/2020 | Mehta et al. | |
| 2020/0099508 A1 | 3/2020 | Ghorbani | |
| 2020/0228336 A1 | 7/2020 | Streit | |
| 2020/0228339 A1 | 7/2020 | Barham et al. | |
| 2020/0351097 A1 | 11/2020 | Streit | |
| 2020/0365143 A1 | 11/2020 | Ogawa et al. | |
| 2020/0387835 A1 | 12/2020 | Sandepudi et al. | |
| 2021/0014039 A1 | 1/2021 | Zhang et al. | |
| 2021/0097158 A1 | 4/2021 | Lee et al. | |
| 2021/0141007 A1 | 5/2021 | Gu et al. | |
| 2021/0141896 A1 | 5/2021 | Streit | |
| 2021/0224563 A1 | 7/2021 | Patel et al. | |
| 2021/0319784 A1 | 10/2021 | Le Roux et al. | |
| 2021/0377298 A1 | 12/2021 | Streit | |
| 2022/0078206 A1 | 3/2022 | Streit | |
| 2022/0100896 A1 | 3/2022 | Streit | |
| 2022/0147602 A1 | 5/2022 | Streit | |
| 2022/0147607 A1 | 5/2022 | Streit | |
| 2022/0150068 A1 | 5/2022 | Streit | |
| 2022/0229890 A1 | 7/2022 | Streit | |

OTHER PUBLICATIONS

International Search Report and Written Opinion dated Aug. 26, 2019, in connection with International Application No. PCT/US2019/021100.

International Preliminary Report on Patentability dated Sep. 17, 2020, in connection with International Application No. PCT/US2019/021100.

International Search Report and Written Opinion dated Sep. 30, 2019, in connection with International Application No. PCT/US2019/039537.

International Preliminary Report on Patentability dated Jan. 7, 2021, in connection with International Application No. PCT/US2019/039537.

International Preliminary Report on Patentability dated Feb. 24, 2022, in connection with International Application No. PCT/US2020/046061.

International Search Report and Written Opinion dated Oct. 29, 2020, in connection with International Application No. PCT/US2020/046061.

Invitation to Pay Additional Fees dated Dec. 3, 2020, in connection with International Application No. PCT/US2020/050935.

International Search Report and Written Opinion dated Feb. 3, 2021, in connection with International Application No. PCT/US2020/050935.

International Preliminary Report on Patentability dated Mar. 31, 2022, in connection with International Application No. PCT/US2020/050935.

International Search Report and Written Opinion dated Nov. 15, 2021, in connection with International Application No. PCT/US2021/045745.

Al-Waisy et al., A Multimodal Biometric System for Personal Identification Based on Deep Learning Approaches.2017 Seventh International Conference on Emerging Security Technologies (EST). 2017 IEEE. 2017; pp. 162-168.

Chamatidis et al., Using deep learning neural networks for ECG based authentication. 2017 international Carnahan conference on security technology (ICCST) Oct. 23, 2017. 6 pages.

Chen et al., Deep ranking for person re-identification via joint representation learning. IEEE Transactions on Image Processing. Mar. 2, 20163;25(5):2353-67.

Chen et al., Learning Multi-channel Deep Feature Representations for Face Recognition. JMLT: Workshop and Conference Proceedings. 2015:44;60-71.

Graepel et al. "ML Confidential: Machine Learning on Encrypted Data", 2012, SpringerOVeralg Berlin Heidelberg 2013, pp. 1-21 ( Year: 2013).

Inamdar et al., Real-Time Face Mask Identification Using Facemasknet Deep Learning Network. Available at SSRN 3663305. Jul. 29, 2020;7 pages.

Kurban et al., A Multi-Biometric Recognition System Based On Deep Features of Face and Gesture Energy Image. 2017 IEEE International Conference on Innovations in Intelligent. Systems and Applications. 2017; 4 pages, https://ieeexplore.ieee.org/stamp/stamp.jsp?tp=&arnumber=8001186.

Lu et al., Discriminative Deep Metric Learning for Face and Kinship Verification. IEEE Transactions on Image Processing. 2017; 26 (9): 4269-4282.

Ma et al., A Secure Face-Verification Scheme Based on Homomorphic Encryption and Deep Neural Networks. IEEE. Sep. 6, 2017: 5:16532-16538.

Rattani et al., Multi-biometic Convoutional NeuralNetworks for Mobile User Authentication. 2018 IEEE International Symposium on Technologies for Homeland Security (HST). 2018; pp. 1-6.

Streit et al., Privacy Enabled Biometric Search. ArXiv e-prints. Aug. 16, 2017. 7 pages.

Stuhlsatz et al., Feature Extraction with Deep Neural Networks by a Generalized Discriminant Analysis. IEEE Transactions on Neural Networks and Learning Systems. Apr. 2012; 23(4): 596-608.

Wang et al., End-to-end encrypted traffic classification with one-dimensional convolution neural networks. 2017 IEEE International Conference on Intelligence and Security Informatics (ISI). 6 pages.

Xie et al "Crypto-Nets: Neural Networks over Encrypted data", 2014, ICLR pp. 1-9 (Year: 2014).

Zhang et al., Bit-scalable deep hashing with regularized similarity learning for image retrieval and person re-identification. IEEE Transactions on Image Processing. Aug. 11, 2015;24(12):4766-79.

Zhang et al., Face Detection Based on Multi Task Learning and Multi Layer Feature Fusion. 2017 6th International Conference on Computer Science and Network Technology (ICCSNT). 2017: 289-293.

\* cited by examiner

BIOMETRIC AUTHENTICATION

RELATED APPLICATIONS

This application is a Continuation of and claims priority under 35 U.S.C. § 120 to U.S. application Ser. No. 16/022,101, filed Jun. 28, 2018, entitled "BIOMETRIC AUTHENTICATION", which is herein incorporated by reference in its entirety.

BACKGROUND OF THE INVENTION

1. Field of the Invention

At least one example in accordance with the present invention relates generally to biometric authentication.

2. Discussion of Related Art

The implementation of user authentication systems in access-controlled environments is generally known. Mobile computing devices, such as smartphones, may implement biometric authentication systems to prevent access to access-controlled content of the mobile computing devices to unauthorized parties. For example, the access-controlled content of the mobile computing device may require that a user enter a correct Personal Identification Number (PIN) or provide an image of the user's fingerprint to the mobile computing device to access the access-controlled content.

SUMMARY

According to at least one aspect of the present invention, a method of authorizing access to access-controlled environments is provided, including receiving, passively by a computing device, user behavior authentication information indicative of a behavior of a user of the computing device, comparing, by the computing device, the user behavior authentication information to a stored user identifier associated with the user, calculating, by the computing device, a user identity probability based on the comparison of the user behavior authentication information to the stored user identifier, receiving, by the computing device, a request from the user to execute an access-controlled function, and granting, by the computing device, the request from the user responsive to determining that the user identity probability satisfies a first identity probability threshold associated with the access-controlled function.

In one embodiment, the user behavior authentication information includes information indicative of at least one of physical behavior of a user and logical behavior. In some embodiments, the physical behavior of the user includes an angle at which the user holds the computing device. In an embodiment, passively receiving the user behavior authentication information is performed without prompting the user to provide the user behavior authentication information.

In at least one embodiment, the method further includes receiving, by the computing device, a second request from the user to execute a second access-controlled function, prompting, by the computing device, the user to provide at least one biometric input responsive to determining that the user identity probability does not satisfy a second identity probability threshold associated with the second access-controlled function, receiving, by the computing device, the at least one biometric input from the user, comparing, by the computing device, the at least one biometric input to a user profile, calculating, by the computing device, a second user identity probability based on the comparison of the at least one biometric input to the user profile, adjusting, by the computing device, the user identity probability based on the second user identity probability, and granting, by the computing device, the second request from the user responsive to determining that the user identity probability satisfies the second identity probability threshold.

In some embodiments, the user profile includes an encrypted biometric value corresponding to the user, the encrypted biometric value being encrypted by a first encryption algorithm. In one embodiment, comparing the at least one biometric input to the user profile includes encrypting the at least one biometric input using the first encryption algorithm to generate at least one encrypted biometric input, and comparing the at least one encrypted biometric input to the encrypted biometric value.

In one embodiment, the method includes receiving, by the computing device, a third request from the user to execute a third access-controlled function, determining, by the computing device, that the user identity probability does not satisfy a third identity probability threshold associated with the third access-controlled function, receiving, by the computing device, a liveness indicator from the use, calculating, by the computing device, a third user identity probability based on the liveness indicator, adjusting, by the computing device, the user identity probability based on the third user identity probability, and granting, by the computing device, the third request from the user responsive to determining that the user identity probability satisfies the third identity probability threshold.

In one embodiment, the liveness indicator includes an indicator that the user is a live human user. In an embodiment, the liveness indicator includes at least one of an audio recording of the user speaking a phrase generated by the computing device and a video of the user performing a gesture generated by the computing device. In some embodiments, receiving the liveness indicator includes receiving, passively by the computing device, one or more signals indicative of one or more vital signs of the user.

According to aspects of the present disclosure, a method of authorizing access to access-controlled environments is provided including receiving, passively by a computing device, user behavior authentication information indicative of a behavior of a user of the computing device, comparing, by the computing device, the user behavior authentication information to a stored user identifier associated with the user, calculating, by the computing device, a first user identity probability based on the comparison of the user behavior authentication information to the stored user identifier, receiving, by the computing device, a request from the user to execute an access-controlled function, prompting, by the computing device, the user to provide at least one biometric input responsive to determining that the first user identity probability does not satisfy a first identity probability threshold associated with the access-controlled function, receiving, by the computing device, the at least one biometric input from the user, comparing, by the computing device, the at least one biometric input to a user profile, calculating, by the computing device, a second user identity probability based on the comparison of the at least one biometric input to the user profile, adjusting, by the computing device, the first user identity probability based on the second user identity probability, and granting, by the computing device, the request from the user responsive to determining that the first user identity probability satisfies the first identity probability threshold.

In one embodiment, the at least one biometric input includes a plurality of biometric inputs. In some embodiments, passively receiving the user behavior authentication information is performed without prompting the user to provide the user behavior authentication information. In at least one embodiment, the user profile includes an encrypted biometric value corresponding to the user, the encrypted biometric value being encrypted by a first encryption algorithm. In some embodiments, the method includes encrypting the biometric input using the first encryption algorithm to generate an encrypted biometric input, and comparing the encrypted biometric input to the encrypted biometric value.

In at least one embodiment, the method includes receiving a second request from the user to execute a second access-controlled function. prompting the user to provide a liveness indicator responsive to determining that the first user identity probability does not satisfy a second identity probability threshold associated with the second access-controlled function, receiving the liveness indicator from the user, calculating a third user identity probability based on the receipt of the liveness indicator, adjusting the first user identity probability based on the third user identity probability, and granting the second request from the user responsive to determining that the first user identity probability satisfies the second identity probability threshold.

According to one aspect of the present disclosure, a method of authorizing access to access-controlled environments is provided comprising receiving, by a computing device, authentication information including at least one of user behavior information indicative of a behavior of a user of the computing device, and one or more biometric inputs, comparing, by the computing device, the authentication information to a stored user identifier associated with the user, calculating, by the computing device, a first user identity probability based on the comparison of the authentication information to the stored user identifier, receiving, by the computing device, a request from the user to execute an access-controlled function, prompting the user to provide a liveness indicator responsive to determining that the first user identity probability does not satisfy a first identity probability threshold associated with the access-controlled function, receiving the liveness indicator from the user, calculating a second user identity probability based on the liveness indicator, adjusting the first user identity probability based on the second user identity probability, and granting the request from the user responsive to determining that the first user identity probability satisfies the first identity probability threshold.

In one embodiment, the one or more biometric input includes a plurality of biometric inputs. In at least one embodiment, the liveness indicator includes at least one of an audio recording of the user speaking a phrase generated by the computing device and a video of the user performing a gesture generated by the computing device.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE INVENTION

Figure 1:
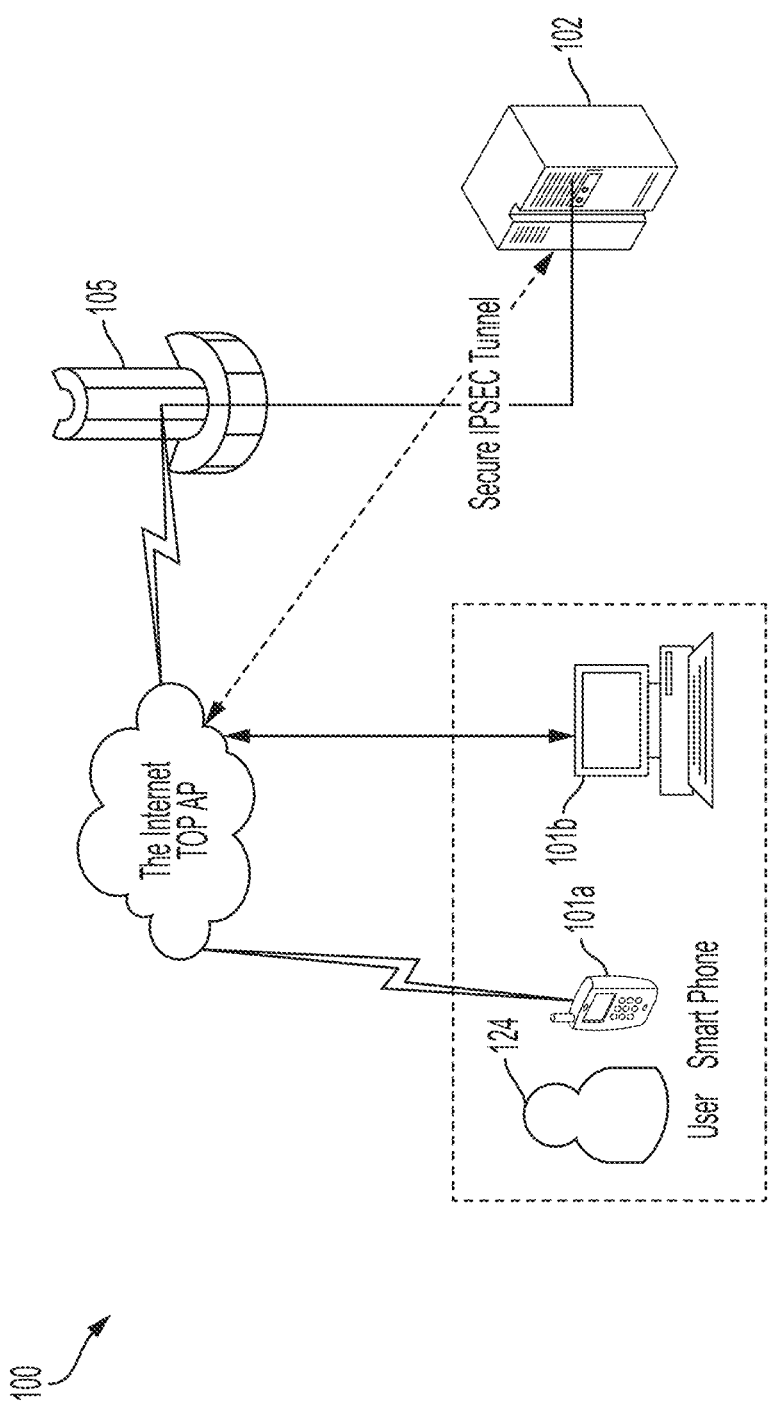
FIG. 1 illustrates a diagram of a system for controlling access to an access-controlled content according to an embodiment.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

User authentication systems for a user device may be effective in preventing unauthorized access to access-controlled environments. For example, user devices utilizing conventional user authentication systems may implement one-factor authentication systems requiring that users actively input a PIN, for example, or allow the user device to scan and verify a fingerprint of the user. Security may be further enhanced by requiring multiple factors of authentication, such as by requiring both a PIN and a fingerprint scan.

Conventional user authentication systems, such as those described above, may cause inconvenience to a user. For example, the user may be inconvenienced by devoting time and attention to actively providing one or more authentication inputs. Moreover, the degree of authentication required may not correspond to a criticality of a function to be executed. For example, the same degree of authentication may be required for a lowest-criticality function executed by the user device (for example, displaying weather information) and for a highest-criticality function executed by the user device (for example, transferring a large sum of money via the user device).

Embodiments disclosed herein provide multiple types of user authentication to allow or disallow access to an access-controlled environment of a user device. A first type of user authentication includes passive authentication, which does not require an affirmative authentication action to be executed by the user in response to a prompt by the user device. For example, passive authentication information might include determining an angle at which a user usually holds the user device.

A second type of user authentication includes active authentication, which includes prompting the user to actively provide authentication information. For example, active information might include a scan of a user's fingerprint, received responsive to a prompt from the user device. A third type of user authentication includes liveness authentication, which may aid in determining if an entity providing authentication information to the user device is a live human user. For example, liveness authentication information might include information indicative of a heartbeat of the user. A type and/or criticality of a protected function to be executed by the user device may at least partially determine which, and how many, types of user authentication are required for access to be granted to the protected function.

FIG. 1 illustrates a diagram of a system 100 for controlling access to access-controlled content according to an embodiment. The system 100 includes a system server 105 and one or more user devices 101 including a mobile device 101a and a computing device 101b. The system 100 can also include one or more remote computing devices 102.

The system server 105 can be practically any computing device and/or data-processing apparatus capable of communicating with the user devices 101 and remote computing devices 102 and receiving, transmitting, and storing electronic information and processing requests as further described herein. Similarly, the remote computing device 102 can be practically any computing device and/or data processing apparatus capable of communicating with the system server 105 and/or the user devices 101 and receiving, transmitting, and storing electronic information and processing requests as further described herein. It should also be understood that the system server 105 and/or remote computing device 102 can be any number of networked or cloud-based computing devices.

In some implementations, remote computing device 102 can be associated with an enterprise organization that maintains user accounts and requires authentication of account holders prior to granting access to secure networked environments (for example, secure website, bank, Virtual Private Networks [VPNs], payment providers, and the like). The various types of user accounts used to access or interact with such networked environments are referred to herein as transaction accounts, which may include any type of account including but not limited to a financial transaction account.

The user devices 101 can be configured to communicate with one another, the system server 105, and/or the remote computing device 102, such as by transmitting electronic information thereto and receiving electronic information therefrom as further described herein. The user devices 101 can also be configured to receive user inputs as well as capture and process biometric information, for example, digital images and voice recordings of a user 124.

The mobile device 101a can be any mobile computing device and/or data processing apparatus capable of embodying the systems and/or methods described herein, including but not limited to a personal computer, tablet computer, personal digital assistant, mobile electronic device, cellular telephone, or smartphone device. The computing device 101b is intended to represent various forms of computing devices which a user can interact with, such as workstations, a personal computer, laptop computer, dedicated point-of-sale systems, ATM terminals, access control devices, voice-controlled devices, remote-controlled device, Internet of Things (IoT) devices (for example, temperature sensors, smartwatches, garage door sensors, and so forth), or other appropriate digital computers.

As further described herein, the system for authorizing access to an access-controlled system 100 facilitates the authentication of a user 124. In some implementations, the system server 105 can also implement rules governing access to information and/or the transmission of information between a variety of computing devices which users can interact with (for example, mobile device 101a, computing device 101b) and one or more trusted back-end servers (for example, system server 105 and remote computing device 102). More specifically, the system server 105 can enforce rules governing the user's access to information, as well as the sharing of information with third-parties as authorized by the user. For example, the system server 105 can regulate access to a database of information pertaining to a user. The information may have been biometrically authenticated by the user, and access to that information may be limited according to rules defined by the user. By way of further example, the system server 105 may regulate a database of information and grant access to the information to an authenticated user according to rules or permissions previously granted to the user.

While FIG. 1 depicts the system for authorizing access to an access-controlled system 100 with respect to a mobile device 101a and a user computing device 101b and a remote computing device 102, any number of such devices may interact with the system in the manner described herein. While FIG. 1 depicts a system 100 with respect to the user 124, any number of users may interact with the system in the manner described herein.

While the various computing devices and machines referenced herein, including but not limited to mobile device 101a, system server 105, and remote computing device 102, are referred to as individual/single devices and/or machines, in certain implementations the referenced devices and machines, and their associated and/or accompanying operations, features, and/or functionalities can be combined or arranged or otherwise employed across any number of such devices and/or machines, such as over a network connection or wired connection, as is known to those of skill in the art.

The exemplary systems and methods described herein in the context of the mobile device 101a are not specifically limited to the mobile device and can be implemented using other enabled computing devices (for example, the user computing device 102).

Figure 2A:
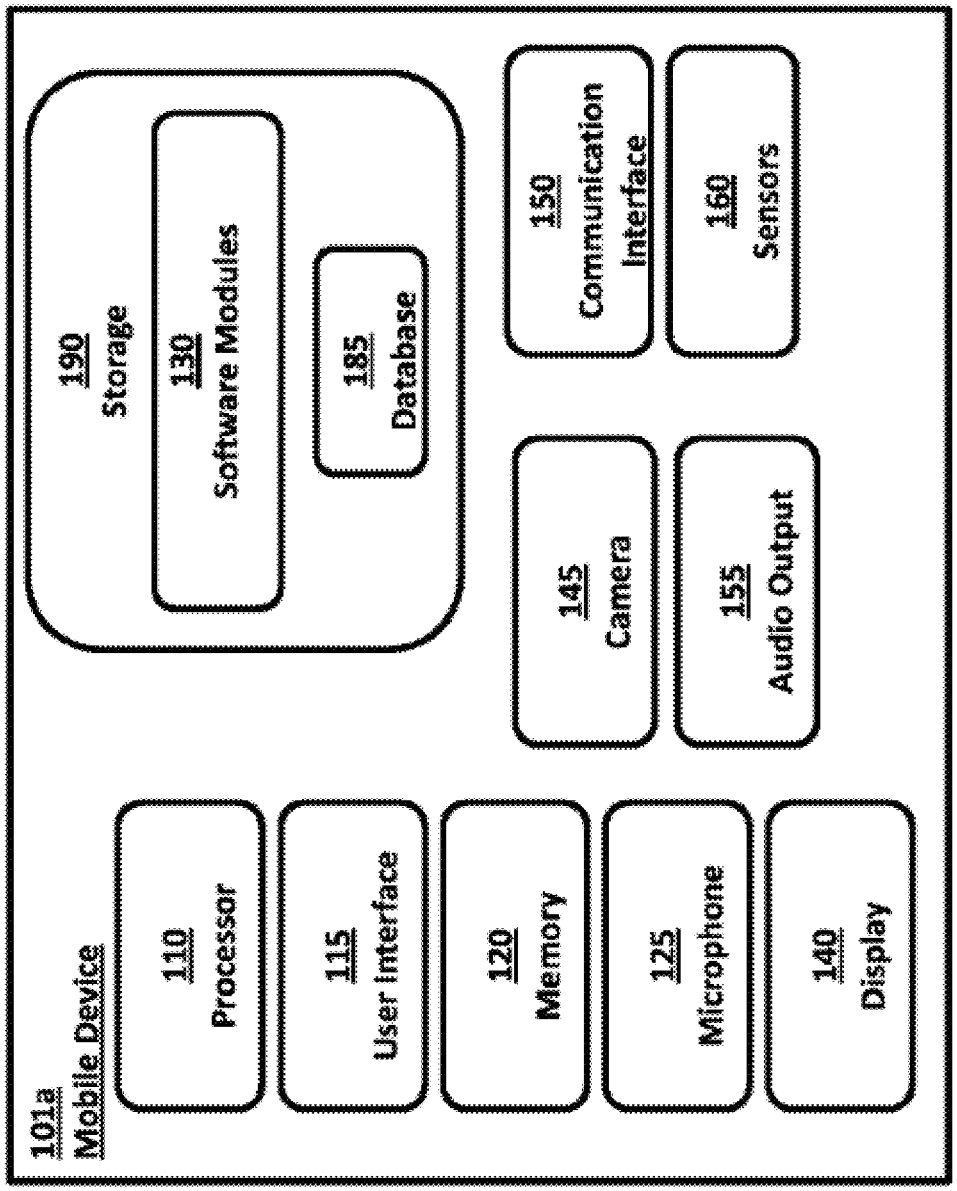
FIG. 2A illustrates a block diagram of a mobile device according to an embodiment.

In reference to FIG. 2A, one embodiment of the mobile device 101a includes various hardware and software components which serve to enable operation of the system, including one or more processors 110, a user interface 115, a memory 120, a microphone 125, a display 140, a camera 145, a communication interface 150, an audio output 155, one or more sensors 160, and a storage 190. Processor 110 serves to execute a client application in the form of software instructions which can be loaded into memory 120. Processor 110 can include any number of processors, a Central Processing Unit (CPU), a Graphics Processing Unit (GPU), a multi-processor core, or any other type of processor, depending on the particular implementation.

Preferably, the memory 120 and/or the storage 190 are accessible by the processor 110, thereby enabling the processor 110 to receive and execute instructions encoded in the memory 120 and/or on the storage 190 so as to cause the mobile device 101a and its various hardware components to carry out operations for aspects of the systems and methods as will be described in greater detail below. Memory 120 can include, for example, a random access memory (RAM) or any other suitable volatile or non-volatile computer readable storage medium. In addition, the memory 120 can be fixed or removable. The storage 190 can take various forms, depending on the particular implementation. For example, the storage 190 can contain one or more components or devices such as a hard drive, a flash memory, a rewritable optical disk, a rewritable magnetic tape, or some combination of the above. Storage 190 also can be fixed or removable.

Figure 2B:
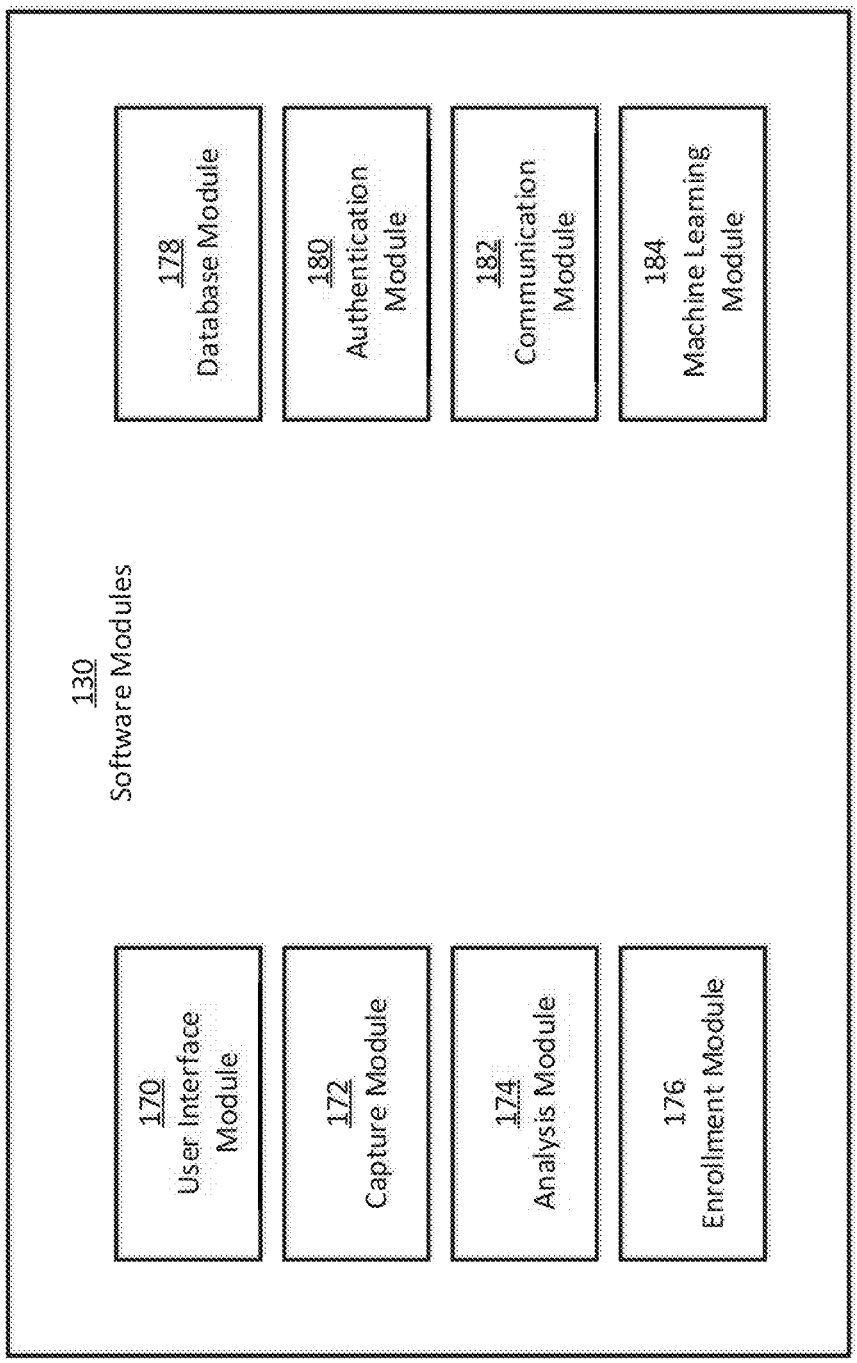
FIG. 2B illustrates a block diagram of software modules according to an embodiment.

One or more software modules 130 are encoded in the storage 190 and/or in the memory 120. The software modules 130 can comprise one or more software programs or applications having computer program code or a set of instructions executed in the processor 110. As depicted in FIG. 2B, one embodiment of the software modules 130 includes a user interface module 170, a biometric capture module 172, an analysis module 174, an enrollment module 176, a database module 178, an authentication module 180, a communication module 182, and a machine learning module 184 which are executed by processor 110. Such computer program code or instructions configure the processor 110 to carry out operations of the systems and methods disclosed herein and can be written in any combination of one or more programming languages.

The program code can execute entirely on mobile device 101a, as a stand-alone software package, partly on the mobile device 101a, partly on system server 105, or entirely on system server 105 or another remote computer/device. In one example, the remote computer can be connected to mobile device 101a through any type of network, including a Local Area Network (LAN) or a Wide Area Network (WAN), mobile communications network, cellular network, or the connection can be made to an external computer (for example, through the Internet using an Internet Service Provider).

It can also be said that the program code of software modules 130 and one or more computer-readable storage devices (such as memory 120 and/or storage 190) form a computer program product which can be manufactured and/or distributed in accordance with the present invention, as is known to those of ordinary skill in the art.

It should be understood that in some illustrative embodiments, one or more of the software modules 130 can be downloaded over a network to storage 190 from another device or system via communication interface 150 for use within the system authorizing access to an access-controlled system 100. In addition, it should be noted that other information and/or data relevant to the operation of the present systems and methods (such as database 185) can also be stored on storage. In some embodiments, and as discussed in greater detail below, data stored on the mobile device 101a and/or system server 105 can be encrypted.

Also preferably stored on storage 190 is database 185. As will be described in greater detail below, the database 185 contains and/or maintains various data items and elements which are utilized throughout the various operations of the system and method for authenticating a user 124. The information stored in database 185 can include but is not limited to a user profile, as will be described in greater detail herein. It should be noted that although database 185 is depicted as being configured locally with respect to mobile device 101a, in certain implementations the database 185 and/or various of the data elements stored therein can, in addition or alternatively, be located remotely (such as on a remote device 102 or system server 105, for example) and connected to the mobile device 101a through a network in a manner known to those of ordinary skill in the art. In some embodiments, the database 185 may be supplemented with, or replaced by, one or more alternate storage media. For example, the storage 190 may include a file store, or any other persistent storage medium, in lieu of or in addition to the database 185.

In some embodiments, the storage 190 may be configured to store one or more pre-trained neural networks, as discussed in greater detail below. For example, the storage 190 may be configured to store one or more one-to-many pre-trained neural networks. The pre-trained neural networks may be utilized when a connection between the mobile device 101a and the system server 105 is unavailable, for example.

A user interface 115 is also operatively connected to the processor 110. The user interface 115 can include one or more input or output device(s) such as switch(es), button(s), key(s), a fingerprint pad, a touch-screen, microphones, and so forth. The user interface 115 serves to facilitate the capture of commands from the user such as on-off commands or user information and settings related to operation of the system 100 for authenticating a user. For example, the user interface 115 serves to facilitate the capture of certain information from the mobile device 101a such as personal user information for enrolling with the system so as to create a user profile.

The mobile device 101a can also include a display 140 which is also operatively connected to the processor 110. The display 140 includes a screen or any other such presentation device which enables the system to instruct or otherwise provide feedback to the user regarding the operation of the system for authenticating a user 100. By way of example, the display can be a digital display such as a dot matrix display or other 2-dimensional display.

By way of further example, the user interface 115 and the display 140 can be integrated into a touch screen display. Accordingly, the display 140 is also used to show a graphical user interface, which can display various data and provide "forms" that include fields which allow for the entry of information by the user. Touching the touch screen at locations corresponding to the display of a graphical user interface allows the person to interact with the device to enter data, change settings, control functions, etc. When the touch screen is touched, the user interface 115 communicates changes to the processor 110, and settings can be changed or user-entered information can be captured and stored in the memory 120.

Mobile device 101a also includes a camera 145 capable of capturing digital images. The camera 145 can be one or more imaging devices configured to capture images. For example, the camera 145 may be utilized by a user, such as the user 124, to capture one or more images of a biometric feature of the user. In such examples, the camera 145 facilitates the capture of images and/or video of the user for the purpose of image analysis by the processor 110 executing the secure authentication application which includes identifying biometric features for authenticating the user. The camera 145, which may include one or more cameras, may be configured to capture light in the visible spectrum, or light outside of the visible spectrum, such as infrared light. The mobile device 101a and/or the camera 145 can also include one or more light or signal emitters (not shown), such as a visible light emitter and/or infrared light emitter.

The camera 145 can be integrated into the mobile device 101a, such as a front-facing camera and/or rear-facing camera which incorporates a sensor, for example and without limitation a CCD or CMOS sensor. Alternatively, the camera 145 can be external to the mobile device 101a. In addition, the mobile device 101a can also include one or more microphones 125 for capturing audio recordings. For example, the microphone 125 may be utilized by a user, such as the user 124, to capture one or more phrases spoken by the user, where the spoken phrases may be used to biometrically authenticate the user.

Audio output 155 is also operatively connected to the processor 110. Audio output can be any type of speaker system which is configured to play electronic audio files as would be understood by those skilled in the art. Audio output can be integrated into the mobile device 101a or external to the mobile device 101a.

Various hardware devices/sensors 160 are also operatively connected to the processor 110. The sensors 160 can include: an on-board clock to track time of day, etc.; a GPS-enabled device to determine a location of the mobile device 101a; one or more accelerometers to track the orientation and acceleration of the mobile device 101a; a gravity magnetometer; proximity sensors; RF radiation sensors; an atmospheric pressure sensor, such as those used to detect altitude; and other such devices as would be understood by those skilled in the art.

Communication interface 150 is also operatively connected to the processor 110 and can be any interface which enables communication between the mobile device 101a and external devices, machines and/or elements including system server 105. Preferably, the communication interface 150 includes, but is not limited to, a modem, a Network Interface Card (NIC), an integrated network interface, a radio frequency transmitter/receiver (for example, BLUETOOTH, cellular, NFC), a satellite communication transmitter/receiver, an infrared port, a USB connection, and/or any other such interfaces for connecting the mobile device 101a to other computing devices and/or communication networks such as private networks and the Internet. Such connections can include a wired connection or a wireless connection (for example, using the 802.11 standard) though it should be understood that the communication interface 150 can be practically any interface which enables communication to/from the mobile device 101a.

At various points during the operation of the system authorizing access to an access-controlled system 100, the mobile device 101a can communicate with one or more computing devices, such as system server 105, user computing device 101b and/or remote computing device 102. Such computing devices transmit and/or receive data to/from mobile device 101a, thereby preferably initiating maintaining, and/or enhancing the operation of the system 100, as will be described in greater detail below.

Figure 2C:
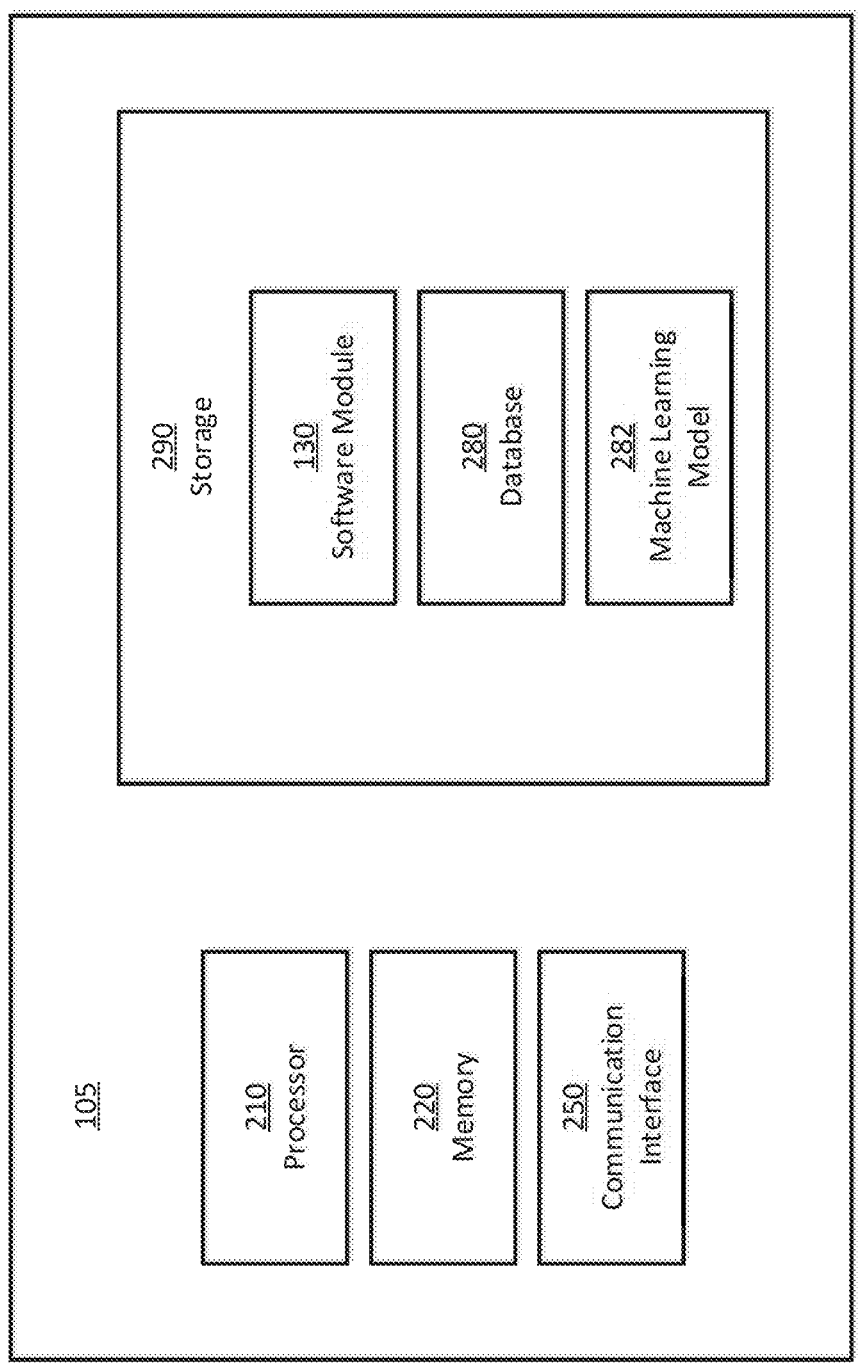
FIG. 2C illustrates a block diagram of a system server according to an embodiment.

FIG. 2C is a block diagram illustrating an exemplary configuration of system server 105. System server 105 can include a processor 210 which is operatively connected to various hardware and software components for facilitating secure authentication of transactions at a terminal. The processor 210 serves to execute instructions to perform various operations relating to user authentication and transaction processing as will be described in greater detail below. The processor 210 can include any number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a Random Access Memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 130 (depicted in FIG. 2B) and a machine learning model 282 are encoded in the storage 290 and/or in the memory 220. The software modules 130 can comprise one or more software programs or applications (collectively referred to as the "secure authentication server application") having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, mobile device 101a and/or user computing device 101b, or entirely on such remote computing devices.

As depicted in FIG. 2B, preferably included among the software modules 130 are an analysis module 174, an enrollment module 176, a database module 178, an authentication module 180, a communication module 182, and a machine learning module 184, which are executed by the system server's processor 210. The machine learning module 184 may be configured to execute one or more neural networks, including partially- or fully-connected neural networks, Long Short Term Memory (LSTM) neural networks, convolution neural networks (CNNs), or other neural networks. For example, the machine learning module 184 may be configured to execute one or more neural networks according to one or more neural network models stored in the machine learning model 282. The machine learning model 282 may store templates of neural networks to be executed to facilitate execution of the one or more neural networks by the machine learning module 184. In at least one embodiment, the machine learning model 282 may be further configured to train the stored neural networks and provide the trained neural networks to the machine learning module 184.

Also preferably stored on the storage 290 is a database 280. As will be described in greater detail below, the database 280 contains and/or maintains various data items and elements which are utilized throughout the various operations of the system 100, including but not limited to user profiles as will be described in greater detail herein. It should be noted that although the database 280 is depicted as being configured locally to the computing device 205, in certain implementations the database 280 and/or various of the data elements stored therein can be stored on a computer-readable memory or storage medium which is located remotely and connected to the system server 105 through a network (not shown), in a manner known to those of ordinary skill in the art.

A communication interface 250 is also operatively connected to the processor 210. The communication interface 250 can be any interface which enables communication between the system server 105 and external devices, machines and/or elements. In certain implementations, the communication interface 250 includes, but is not limited to, a modem, a Network Interface Card (NIC), an integrated network interface, a radio frequency transmitter/receiver (for example, BLUETOOTH, cellular, NFC), a satellite communication transmitter/receiver, an infrared port, a USB connection, and/or any other such interfaces for connecting the computing device 105 to other computing devices and/or communication networks, such as private networks and the Internet. Such connections can include a wired connection or a wireless connection (for example, using the 802.11 standard) though it should be understood that communication interface 250 can be practically any interface which enables communication to/from the processor 210.

As discussed above, mobile devices such as the mobile device 101a may be configured to execute one or more authentication processes to regulate access to access-controlled environments accessible to the mobile device 101a. Regulating access to the access-controlled environments may include allowing access to an access-controlled environment if a determination can be made with sufficient certainty that a user requesting access to an access-controlled function is a user with access permissions to the access-controlled function. Certainty of a user's identity may be expressed as a percentage value, and different access-controlled functions may each require a respective minimum necessary value of identity certainty to grant access to the respective access-controlled functions.

Figure 3A:
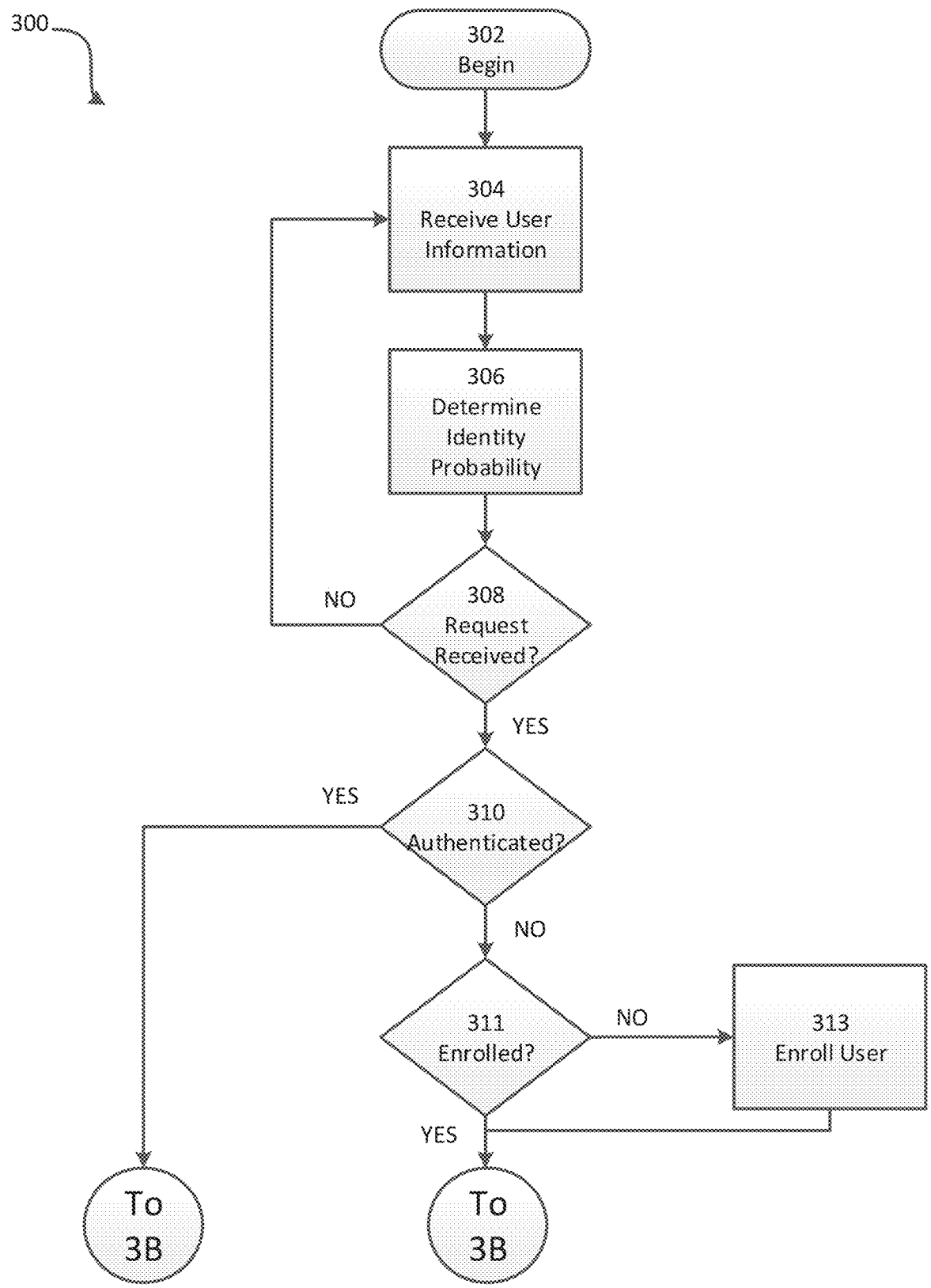
FIG. 3A illustrates a portion of a process for regulating access to access-controlled environments according to an embodiment.
Figure 3B:
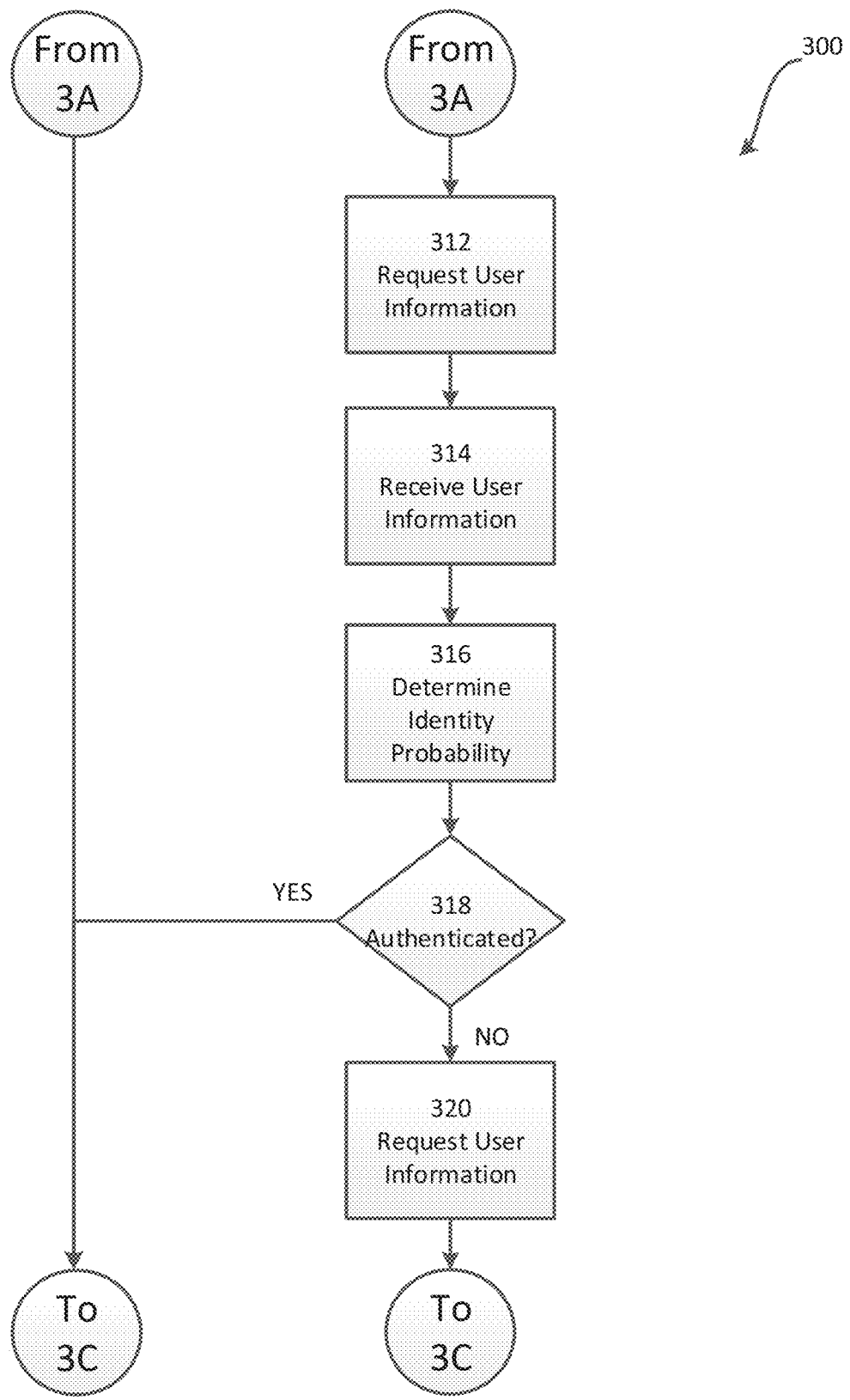
FIG. 3B illustrates a portion of the process for regulating access to access-controlled environments according to an embodiment.
Figure 3C:
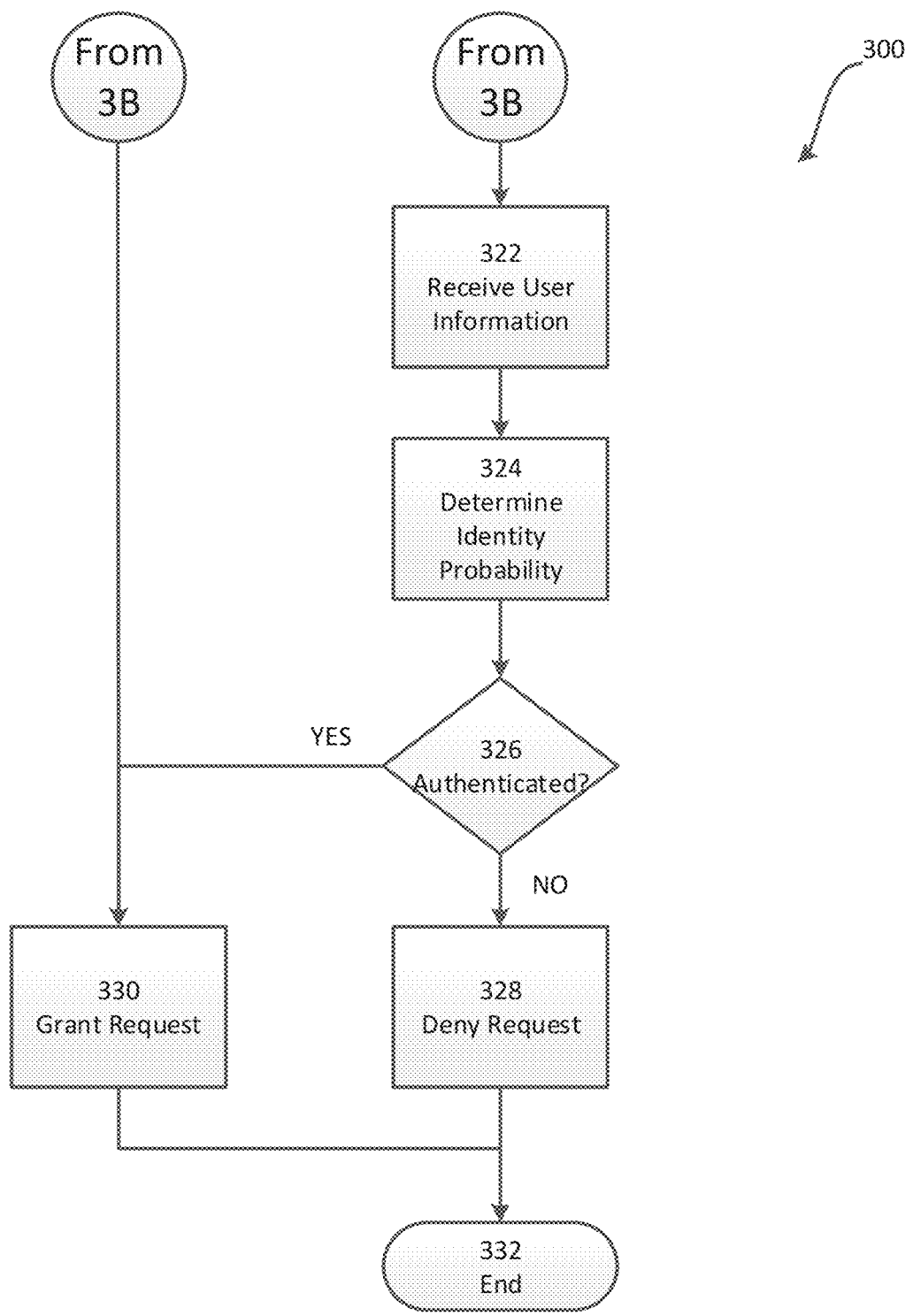
FIG. 3C illustrates a portion of the process for regulating access to access-controlled environments according to an embodiment.

Determining a certainty of a user's identity may be performed by a mobile device according to one of several types of authentication processes. FIGS. 3A-3C illustrate a process 300 of regulating access to access-controlled environments according to an embodiment. For example, the process 300 may be executed by a mobile device, such as the mobile device 101a, configured to execute one or more applications to which access may be regulated. Each application may require an individual level of certainty that a user has access privileges to the features of the respective application. For example, access to a first feature of a banking application may be denied unless the mobile device 101a is at least 65% certain that a user of the mobile device 101a is an authorized user for whom access to the first feature is allowed, and a second feature of the banking application may be denied unless the mobile device 101a is at least 85% certain that a user of the mobile device 101a is an authorized user for whom access to the second feature is allowed.

In some examples, a feature may include different levels of certainty requirements. For example, a withdrawal feature of a banking application may require a first level of certainty to withdraw less than $100, and may require a second level of certainty to withdraw more than $100.

At act 302, the process 300 begins. At act 304, user information is received. For example, the user information may include passive information received by the mobile device 101a without affirmatively prompting the user to provide the user information, as discussed in greater detail below. An example of passive information may include, for example, information indicative of an angle at which a user is holding the mobile device 101a, which may be obtained from the sensors 160, such as one or more accelerometers.

At act 306, a first user identity probability is determined. The first user identity probability may be determined based on information obtained in connection with act 304. For example, in at least one example, the information obtained in connection with act 304 may be used as an input to a neural network configured to provide a user identity probability based at least in part on passive information inputs, as discussed in greater detail below. The user identity probability may further be determined based on an elapsed time since a previous authentication. For example, the user identity probability may be higher if the mobile device 101a recently authenticated a fingerprint of the user, as discussed in greater detail below. The user identity probability may be expressed as a percentage value, and may indicate a certainty of a user device executing the process 300 that a user providing authentication information is a user with access privileges to protected functionality of the user device.

At act 308, a determination is made as to whether a request has been received by the mobile device 101a. The mobile device 101a may determine whether a request has been received to access an access-controlled function. For example, the mobile device 101a may determine if a user has selected an access-controlled application executed by the mobile device 101a, such as a mobile banking application configured to restrict access to authenticated users. If a request has not been received (308 NO), then the process returns to act 304, and acts 304 and 306 are repeated to continuously and passively update a user identity probability based on passive information. Otherwise, if a request has been received (308 YES), then the process continues to act 310.

At act 310, a determination is made as to whether a user probability determination is sufficient to grant a request to access to an access-controlled environment. For example, the mobile device 101a may determine if the user identity probability determined at act 306 is sufficient to grant the request received at act 308 YES. In at least one embodiment, the request received at act 308 YES may require a minimum user identity certainty to grant the request. For example, a request to view a bank account balance in a mobile banking application may require a user probability certainty of 65%, whereas a request to transfer funds from the bank account via the mobile banking application may require a user probability certainty 80%.

If the user probability certainty determined at act 306 meets or exceeds the user probability certainty requirements of the request received at act 308 YES (310 YES), then the process 300 continues to act 330. At act 330, access is granted to the access-controlled environment pursuant to the request received at act 308 YES.

Otherwise, if the user probability certainty does not meet or exceed the user probability certainty requirements (310 NO), then the mobile device 101a may determine that additional authentication steps may be necessary before access may be granted to the access-controlled functionality. Accordingly, the process 300 continues to act 311 to perform additional authentication steps.

At act 311, a determination is made as to whether a user has been previously enrolled in a biometric authentication system. For example, determining if a user has been previously enrolled in a biometric authentication system may include determining, by the mobile device 101*a*, if user biometric information has been previously captured and stored in the storage 190. If the user has been previously enrolled (311 YES), then the process 300 continues to act 312. Otherwise, if the user has not been previously enrolled (311 NO), then the process 300 continues to act 313. At act 313, the user is enrolled in the biometric authentication system, as discussed below with respect to FIG. 4, and the process 300 continues to act 312.

At act 312, user information is requested. For example, the mobile device 101*a* may request active authentication information from a user. Active information may include, for example, facial scan information, voice information, fingerprint information, DNA information, or a combination thereof. In some embodiments, the mobile device 101*a* may request multiple forms of active authentication information, such as by requesting multiple fingerprint scans or a fingerprint scan and a facial scan. The active authentication information request may include, for example, a request for the user to place a finger on a fingerprint scanner of the mobile device 101*a* one or more times in one or more positions or orientations. In another example, the active authentication request may include, for example, a request for the user to speak a certain word, sentence, or other phrase displayed via the mobile device 101*a*. At act 314, user information is received. The user information received at act 314 may include active user information received pursuant to the request received at act 312. For example, where the request is a request for the user to place a finger on the fingerprint scanner, the mobile device 101*a* may capture an image of a fingerprint from the user.

At act 316, a second user identity probability is determined. For example, the second user probability determination may be based on the user information received at act 304, which may include passive information, and the user information received at act 314, which may include active information. In at least one example, the information obtained in connection with act 314 may be used as an input to a neural network configured to output a user identity probability based at least in part on active information inputs, as discussed in greater detail below.

The active information received at act 314 may be compared to stored active information associated with an authorized user acquired and stored in the storage 190 during enrollment at act 313 to determine if the information received at act 314 is sufficiently similar to the stored active information. The comparison may be executed using known biometric analysis techniques, and a threshold level of similarity may be set to define a level of similarity which constitutes a sufficiently similar match.

If the comparison indicates that the active information received at act 314 is sufficiently similar to the stored active information, then the first identity probability determined at act 306 may be adjusted to increase by a set amount to yield an adjusted first identity probability. For example, if the first identity probability determined at act 306 is 65%, then a determination that the active information received at act 314 substantially matches the stored active information may increase the first identity probability by 20% to yield an adjusted first identity probability of 85%. Adjusting the first identity probability based on the second user identity probability is discussed in greater detail below.

At act 318, a determination is made as to whether the adjusted first identity probability is sufficient to grant a request to access to an access-controlled environment. For example, the mobile device 101*a* may determine if the adjusted first identity probability determined at act 316 is sufficient to grant the request received at act 308 YES. If the adjusted first identity probability determined at act 316 meets or exceeds the user probability certainty requirements of the request received at act 308 YES (318 YES), then the process 300 continues to act 330. Otherwise, if the adjusted first identity probability does not meet or exceed the user probability certainty requirements (318 NO), the process 300 continues to act 320.

At act 320, third user information is requested. For example, the mobile device 101*a* may request liveness information indicative of whether an entity providing information to the mobile device 101*a* is a live human user, as discussed in greater detail below. At act 322, user information is received. For example, receiving the user information may include capturing audio information spoken by the user with a microphone, such as the microphone 125, as discussed in greater detail below.

In some embodiments, act 320 may be omitted, and receiving liveness information at act 322 may include receiving information which is not requested from a user. Liveness information may include information which is passively acquired without actively requesting the information from the user. For example, the liveness information may include passive liveness information indicative of a user's vital signs which is not actively requested from the user. Passive liveness information may include, for example, detecting a user blinking using a camera coupled to a user device, such as the camera 145.

At act 324, a third user identity probability is determined. For example, the third user probability determination may be based on the user information received at act 304, which may include passive information, the user information received at act 314, which may include active information, and the user information received at act 322, which may include liveness information. The user information received at act 322 may be provided to a neural network configured to determine a probability that the user information was provided by a live human user. If the neural network determines that the user information received at act 322 was provided by a live human user, then the adjusted first identity probability determined at act 316 may be further adjusted to increase by a set amount. For example, if the adjusted first identity probability determined at act 316 is 85%, then a determination that the liveness information received at act 322 substantially matches the stored active information may further adjust the first identity probability to increase by 13% to yield an adjusted first identity probability of 98%.

At act 326, a determination is made as to whether the further adjusted first identity probability determination is sufficient to grant a request to access to an access-controlled environment. For example, the mobile device 101*a* may determine if the further adjusted first identity probability determined at act 324 is sufficient to grant the request received at act 308 YES. If the further adjusted first identity probability determined at act 324 meets or exceeds the user probability certainty requirements of the request received at act 308 YES (326 YES), then the process 300 continues to act 330. At act 330, access to the access-controlled environment is granted. The process 300 ends at act 332.

Otherwise, if the further adjusted first identity probability does not meet or exceed the user probability certainty requirements (326 NO), the process 300 continues to act 328. At act 328, access to the access-controlled environment is denied. For example, the mobile device 101*a* may deny access to the access-controlled environment and display a message on the user interface 115 indicating that access has been denied. The process 300 ends at act 332.

As discussed above with respect to acts 304 and 306, a determination of a user identity may be based at least partially on passive authentication information. In at least one embodiment, authentication based on passive information may be generally considered a most convenient process of authentication at least because a user is not required to affirmatively provide any information or inputs to the mobile device 101*a* in response to a request from the mobile device 101*a*.

Passive information may include information which is nominally referred to herein as minimally-invasive information, medially-invasive information, and maximally-invasive information. However, it is to be appreciated that passive information is divided into sub-groups for purposes of discussion only, and no limitation is meant to be implied by the identified sub-groups.

Minimally-invasive information may generally include information indicative of physical behavior of the mobile device 101*a*. For example, information indicative of physical behavior captured by a user device may include information such as geospatial information, network information (for example, WI-FI information, NFC information, BLUETOOTH information, or cellular information), time-of-day information, physical behavior characteristics (for example, angle information or accelerometer information indicative of an angle or acceleration of the user device), time information indicative of how long authentication takes, frequency information indicative of how frequently authentication takes place (for example, information indicative of how long ago a most recent authentication took place), Internet speed information, VPN status, compass direction information, information captured by a magnetometer, motion data captured from an accelerometer and/or vibrational gyroscope (for example, motion data indicative of an angle at which the mobile device 101*a* is being held, or motion data indicative of a user's gait), information captured from a smart watch (for example, heart rate), IoT data (for example, information captured by one or more IoT-enabled devices), and information indicative of a location and behavior of things and/or people related to a user.

Medially-invasive information may generally include information indicative of logical behavior. Logical behavior may include information indicative of an ambient background of the mobile device 101*a*, including background sounds or nearby objects. For example, medially-invasive information may include information captured by one or more of a microphone, front camera, back camera, or physiological sensor of the user device. The information captured by the microphone may be analyzed to classify ambient sounds, music, biological sounds, and so forth. The information captured by the microphone may include voice information which may be analyzed in connection with a user's passively-enrolled voice. Passive enrollment of a user's voice may include passively learning a user's voice by analyzing the user's voice over time.

The information captured by the front and back cameras may be captured to measure ambient light, determine dimensions of an ambient space, classify ambient objects, and analyze ultraviolet light. The information captured by the front and back camera may also include user facial biometric information which may be analyzed in connection with passively-enrolled facial features. Passive enrollment of a user's facial features may include passively learning a user's facial features by analyzing the user's facial features over time. The information captured by the physiological sensor may include information indicative of a physiological state of the user. For example, the information indicative of the physiological state of the user may include information indicative of a blood pressure of the user.

Maximally-invasive information may generally include information indicative of content behavior. For example, maximally-invasive information may include information indicative of user content accessible to the user device. The user content may include text messages, email records, phone call records, social network activity, browser history and content, and so forth. Analyzing the user content may include analyzing the recipient and content of a message, for example.

As discussed above with respect to act 306, the user information received at act 304 may be analyzed to determine a probability that a user of the user device is a user with access privileges to the user device by inputting the user information to a neural network executed by the mobile device 101*a* in connection with the machine learning model 282 of the system server 105. The neural network may be implemented according to at least one of several known neural network configurations. For example, the neural network may include at least one of a fully-connected neural network and an LSTM neural network.

The neural network may be trained to learn the passive information typically acquired by the mobile device 101*a* when the mobile device 101*a* is in the possession of an authorized user. In at least one embodiment, the neural network is configured to continuously train to adapt to changing baseline information. In one embodiment, training is executed by the machine learning model 282 on the system server 105. The mobile device 101*a* may subsequently compare, at act 306, a state of the mobile device 101*a* with the learned state to determine if the mobile device 101*a* is in the possession of an authorized user.

For example, the neural network may learn, based on physical behavior information obtained from an accelerometer in the mobile device 101*a*, that the authorized user typically holds the mobile device 101*a* at a specific angle. In another example, the neural network may learn, based on logical behavior information obtained from the microphone 125 of the mobile device 101*a*, typical speech patterns of the authorized user. In a final example, the neural network may learn, based on content behavior information accessible to the mobile device 101*a*, that the authorized user rarely generates new content (including, for example, sending emails) during certain hours of a day.

In one implementation, once the neural network has completed an initial training period to learn typical conditions of the passive information when the mobile device 101*a* is in possession of an authorized user, the mobile device 101*a* may generate and store an initial user identifier indicative of the typical conditions of the passive information based on an output of the neural network. For example, the mobile device 101*a* may store the user identifier in the storage 190. The mobile device 101*a* may subsequently generate, at act 306, a user identifier based on information acquired at act 304. The user identifier can be compared to the stored user identifier to determine if the mobile device 101*a* is in the possession of an authorized user. In some embodiments, the mobile device 101*a* continuously generates and stores subsequent user identifiers as the neural network is continuously trained. As discussed above, the neural network may be trained on the machine learning model 282 of the system server 105.

In at least one embodiment, the comparison of the user identifier and the stored user identifier is performed in an encrypted space to enhance security. As used herein, performing a comparison in an encrypted space includes performing a comparison between two or more encrypted values. For example, the stored user identifier may be encrypted using a one-way homomorphic encryption algorithm prior to being stored in the storage 190. The user identifier generated at act 306 may be encrypted subsequent to generation and prior to comparison to the encrypted stored user identifier using the same encryption algorithm used to encrypt the stored user identifier.

A comparison of the user identifier generated at act 306 with the user identifier may include encrypting the user identifiers prior to the comparison, rather than comparing the identifiers in a plaintext format. In at least one embodiment, performing the comparison in the encrypted space may enhance security at least because no plaintext features of the stored user identifier are stored in the storage 190. Accordingly, a malicious user having access to the storage 190 may not have access to plaintext features of the stored user identifier.

As discussed above with respect to act 316, the information received at act 314 may be analyzed by inputting the user information to a neural network executed by the mobile device 101*a* in connection with the system server 105. For example, the neural network may be executed by the mobile device 101*a* in connection with the neural network model 282 of the system server 105. The neural network may be implemented according to at least one of several known neural network configurations. For example, the neural network may include at least one of a fully-connected neural network and a CNN configured to generate and output the second user identity probability.

The neural network may be trained to learn the information received at act 314. In at least one embodiment, the neural network is configured to continuously train to adapt to changing information. The mobile device 101*a* may subsequently compare, at act 316, a state of the information received at act 314 with the learned state to determine if the mobile device 101*a* is in the possession of an authorized user.

For example, the neural network may learn a baseline for biometric information such as a facial scan or fingerprint scan for a user. In one implementation, once the neural network has completed an initial training period to learn typical conditions of the biometric information of the user, the mobile device 101*a* may generate and store an initial user identifier indicative of the typical conditions of the biometric information based on an output of the neural network. The user identifier may be distinct from, or combined with, the user identifier generated in connection with the passive information, as discussed above. For example, the mobile device 101*a* may store the user identifier in the storage 190. The mobile device 101*a* may subsequently generate, at act 316, a user identifier based on information acquired at act 314. The user identifier can be compared to the stored user identifier to determine if the mobile device 101*a* is in the possession of an authorized user. In some embodiments, the mobile device 101*a* continuously generates and stores subsequent user identifiers as the neural network is continuously trained.

In at least one embodiment, the comparison of the user identifier and the stored user identifier is performed in an encrypted space to enhance security. As used herein, performing a comparison in an encrypted space includes performing a comparison between two or more encrypted values. For example, the stored user identifier may be encrypted using a one-way homomorphic encryption algorithm prior to being stored in the storage 190. The user identifier generated at act 316 may be encrypted subsequent to generation and prior to comparison to the encrypted stored user identifier using the same encryption algorithm used to encrypt the stored user identifier.

A comparison of the user identifier generated at act 316 with the stored user identifier may include encrypting the user identifiers prior to the comparison, rather than comparing the identifiers in a plaintext format. In at least one embodiment, performing the comparison in the encrypted space may enhance security at least because no plaintext features of the stored user identifier are stored in the storage 190. Accordingly, a malicious user having access to the storage 190 may not have access to plaintext features of the stored user identifier.

As discussed above, the second user identity probability determined at act 316 may be utilized to adjust the first user identity probability determined at act 306. In some embodiments, the first user identity probability determined at act 306 and the second user identity probability determined at act 316 may be averaged to determine an adjusted first user identity probability. Alternatively, the first user identity probability may be adjusted by a fixed amount in accordance with a value of the second user identity probability.

In one embodiment, if the second user identity probability is above a first threshold, then the first user identity probability may be adjusted by a first amount. If the second user identity probability is above a second threshold, then the first user identity probability may be adjusted by a second amount. For example, the first user identity probability may be 65%, and the second user identity probability may be 85%. The mobile device 101*a* may determine that, if the second user identity probability is above 80%, then the first user identity probability may be adjusted to increase by 10%. Accordingly, the adjusted first user identity probability is 75%.

In another example, the first user identity probability may be 65%, and the second user identity probability may be 95%. The mobile device 101*a* may determine that, if the second user identity probability is above 80%, then the first user identity probability may be adjusted to increase by 10%, and if the second user identity probability is above 90%, then the first user identity probability may be adjusted to increase by 20%. Accordingly, the adjusted first user identity probability is 85%. In other examples, an alternate number of thresholds associated with alternate identity probability adjustments may be implemented.

As discussed above with respect to acts 320-324, the determination of a user identity by a user device may be further based on liveness information requested from a user. Liveness information may include, for example, information indicative of whether or not authentication information being provided to the user device is derived from a live human user. Liveness information may be implemented to mitigate "spoofing" attempts. For example, a spoofing attempt may include a malicious user using a photograph of an authorized user to attempt to pass a facial biometric authentication challenge. The liveness information may be used to determine that the facial information is being provided from a picture, rather than a live human user, and may deny access based on the determination of the spoofing attempt.

Examples of liveness information include voice information, facial information, video information, music information, gesture information, and user vital information. Examples of liveness information may be nominally considered either biometric liveness information or random liveness information.

Biometric liveness information may include information which is collected from the user and which is indicative of a biometric feature of a user. For example, biometric liveness information may include passively-collected information indicative of a user's blood pressure, heart beat, eye blinking, or other signs associated with a live human user. In another example, biometric liveness information may include actively-collected information requested of a user. For example, the actively-collected information may include a fingerprint scan or a facial scan.

Random liveness information may include information which is requested from a user. For example, the mobile device 101a may generate a random phrase and request that the user speak the phrase aloud. In another example, the mobile device 101a may select a random gesture and request that the user perform the specified gesture. The phrase or gesture may be captured by a microphone or camera, respectively, and analyzed to determine if the phrase or gesture substantially matches the phrase or gesture requested of the user.

Analysis of the captured phrase or gesture may be executed using a neural network executed by the mobile device 101a. The neural network may be implemented according to at least one of several known neural network configurations. For example, the neural network may include at least one of a CNN and any other neural network model. For example, the neural network may be configured to receive, as inputs, information indicative of an expected phrase or gesture generated by the user device (for example, the phrase or gesture requested of the user) and information indicative of the received phrase or gesture provided by the user to the user device. The neural network may be configured to output a probability that the received phrase or gesture substantially matches the information indicative of the expected phrase or gesture generated by the user device. The neural network may be a same or different neural network than the neural network executed in connection with act 306, as discussed above.

As discussed above, the second user identity probability determined at act 324 may be utilized to adjust the first user identity probability determined at act 316. In some embodiments, the adjusted user identity probability may be further adjusted in accordance with the third user identity probability. For example, the adjusted first user identity probability determined at act 316 and the third user identity probability determined at act 324 may be averaged to further adjust the adjusted first user identity probability.

In an alternate embodiment, if the third user identity probability is above a first threshold, then the adjusted first user identity probability may be further adjusted by a first amount. If the third user identity probability is above a second threshold, then the adjusted first user identity probability may be further adjusted by a second amount. For example, the adjusted first user identity probability may be 85%, and the third user identity probability may be 96%. The mobile device 101a may determine that, if the third user identity probability is above 95%, then the adjusted first user identity probability may be further adjusted to increase by 10%. Accordingly, the adjusted first user identity probability may be further adjusted to 95%.

In another example, the adjusted first user identity probability may be 85%, and the third user identity probability may be 99%. The mobile device 101a may determine that, if the third user identity probability is above 95%, then the adjusted first user identity probability may be further adjusted to increase by 10%, and if the third user identity probability is above 98%, then the adjusted first user identity probability may be further adjusted to increase by 13%. Accordingly, the adjusted first user identity probability is further adjusted to increase to 98%. In other examples, an alternate number of thresholds associated with alternate identity probability adjustments may be implemented.

Figure 4:
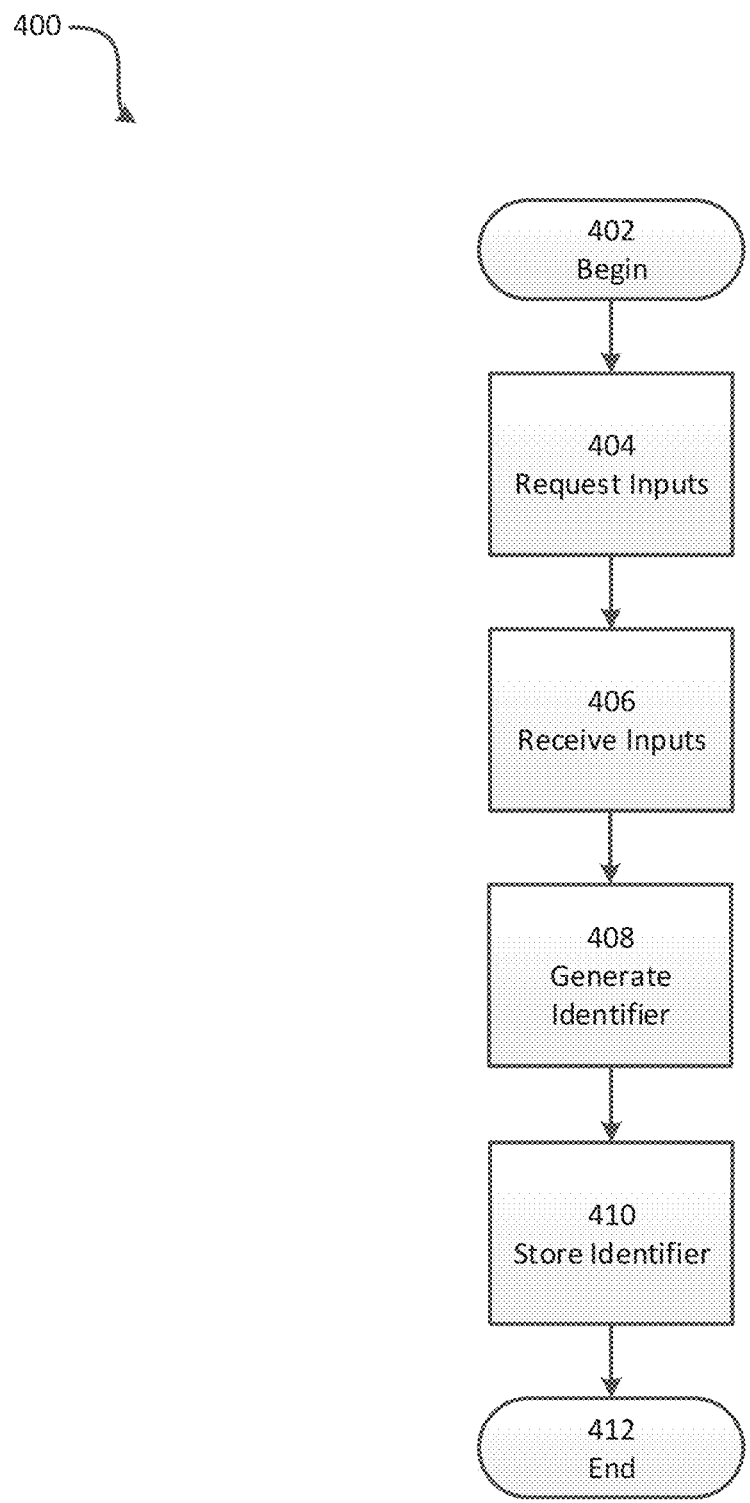
FIG. 4 illustrates a process of enrolling a user with a user device according to an embodiment.

FIG. 4 illustrates a process 400 of enrolling a user with a user device according to an embodiment. For example, the process 400 may be an implementation of act 311. The process 400 may be executed by a user device, such as the mobile device 101a. The process 400 includes acts of requesting inputs, receiving the inputs, generating a user identifier, and storing the user identifier.

At act 402, the process 400 begins. At act 404, inputs are requested. For example, the mobile device 101a may request one or more inputs from a user. The request may include a request for biometric inputs. In one embodiment, a request for biometric inputs may include a request that the user allow an image of their facial features or fingerprints to be captured. In another embodiment, the request for biometric inputs may include a request that the user speak a specific or random phrase to allow audio information indicative of the user's voice to be captured.

At act 406, inputs are received. For example, the mobile device 101a may capture one or more image of the user's facial features and/or fingerprints using the camera 145. In another example, the mobile device 101a may capture audio information of a user speaking a specific or random phrase using the microphone 125. In another example, the mobile device 101a may receive each of the foregoing inputs, including an image of a user's fingerprint, an image of a user's facial features, and audio information indicative of a random or specified phrase.

At act 408, a user biometric profile is generated. For example, the mobile device 101a may generate a user biometric profile based on the inputs received at act 406 by providing the inputs to a neural network configured to generate and output, based on the inputs, a user identifier. At act 410, the user biometric profile, which includes the user identifier, is stored. For example, the mobile device 101a may store a user biometric profile generated at act 408 in the storage 190. In at least one embodiment, the user biometric profile is encrypted prior to storage. For example, a one-way homomorphic encryption algorithm may be executed on the user biometric profile prior to storage in the storage 190. Subsequent comparisons to the biometric profile may be performed in an encrypted space. For example, the active information received at act 314 may be encrypted prior to comparing the encrypted active information to the encrypted, stored biometric profile. In other embodiments, the mobile device 101a may store the user biometric profile generated at act 408 in the storage 190 without encrypting the user biometric profile, and may perform subsequent processing of the user biometric profile using a plaintext comparison. At act 412, the process 400 ends.

As discussed above, each access-controlled function accessible via the mobile device 101a may include a respective minimum user identity certainty criterion. For example, a first function may require a user identity probability of at least 75% in order to grant access. A second function may require a user identity probability of at least 90% in order to grant access. Other functions may require any other user identity probability.

In at least one embodiment, the user identity probability requirement may be specified by a creator of the access-controlled function. For example, a banking application may include several access-controlled functions, such as displaying an account balance or enabling a funds transfer. The user identity probability requirement for each function may be specified by a creator of the banking application, such as the bank affiliated with the banking application.

In some embodiments, the creator of the access-controlled function may specify other requirements in addition to the minimum user identity probability requirement. For example, the creator of the access-controlled function may require that the mobile device 101a be at least 70% certain that the user is a user having access privileges, and may additionally require that the mobile device 101a verify a fingerprint of the user. In other embodiments, creators of access-controlled functions may require any number and type of requirements to access access-controlled functions.

An example of one implementation of the foregoing principles will now be described. A user possesses a mobile device configured to operate similarly to the mobile device 101a and configured to execute the process 300. The user is authorized to possess the mobile device, and is authorized to access access-controlled functions of the mobile device. The mobile device continuously collects passive information and repeatedly calculates an identity probability indicative of a certainty that the mobile device is currently possessed by the user having access permissions to the mobile device. The identity probability is calculated passively, without prompting the user to provide information.

At a first point in time, the mobile device has calculated an identity probability of 75%. Stated differently, the mobile device is 75% certain that the user of the mobile device is a user having access privileges to the access-controlled functions of the mobile device. The user provides an input to the mobile device which the mobile device interprets as a request to view an account balance in a mobile banking application. The mobile device determines that the bank affiliated with the mobile banking application has specified that the mobile device must be at least 70% certain of the user's identity before allowing the user to view the account balance. The mobile device determines that, because the mobile device is more than 70% certain of the user's identity, access is granted. Accordingly, the user is allowed to view the account balance.

At a second point in time, the mobile device has calculated an identity probability of 77%. The user provides an input to the mobile device which the mobile device interprets as a request to withdraw $60 from a bank account via the mobile banking application. The mobile device determines that the bank affiliated with the mobile banking application has specified that the mobile device must be at least 80% certain of the user's identity before allowing the user to withdraw less than $100. The mobile device determines that, because the mobile device is less than 80% certain of the user's identity, additional authentication must be performed. Accordingly, the mobile device requests that the user allow the mobile device to capture an image of the user's fingerprint.

The user has previously enrolled with the mobile device, and the mobile device has a stored biometric profile for the user which includes at least one image of the user's fingerprint. The user allows the mobile device to capture the image of the user's fingerprint, and the mobile device verifies that the captured image of the user's fingerprint is sufficiently similar to the fingerprint in the stored biometric profile. The mobile device determines that providing a matching fingerprint increases an identity probability by 15%. Accordingly, the identity probability increases from 77% to 92%. The mobile device determines that the identity probability is now greater than 80%, and allows the user to withdraw $60.

In at least one embodiment, the identity probability decays over time. For example, the 92% identity probability provided by the successful fingerprint match may decay at a rate of 1% per ten minutes. At a third point in time, the user provides an input to the mobile device which the mobile device interprets as a request to withdraw $80 from a bank account via the mobile banking application. The mobile device determines that the identity probability has decayed to 79%, which is less than the required 80% certainty.

Accordingly, the mobile device may request that the user allow the mobile device to acquire another image of the user's fingerprint. The user allows the mobile device to capture the image of the user's fingerprint, and the mobile device verifies that the captured image of the user's fingerprint is sufficiently similar to the fingerprint in the stored biometric profile. The mobile device determines that providing a matching fingerprint increases an identity probability by 15%. Accordingly, the identity probability increases from 79% to 94%. The mobile device determines that the identity probability is now greater than 80%, and allows the user to withdraw $80.

At a fourth point in time, less than a minute after the third point in time, the mobile device has calculated an identity probability of 94%. The user provides an input to the mobile device which the mobile device interprets as a request to withdraw $200 from a bank account via the mobile banking application. The mobile device determines that the bank affiliated with the mobile banking application has specified that the mobile device must be at least 95% certain of the user's identity before allowing the user to withdraw more than $100. The mobile device determines that, because the mobile device is less than 95% certain of the user's identity, additional authentication must be performed. Accordingly, the mobile device determines that a liveness of the user must be verified.

Accordingly, the mobile device generates a random phrase and requests that the user speak the random phrase aloud. The user speaks the random phrase aloud, and the mobile device captures the audio information provided by the user. The mobile device verifies that the captured audio information is indicative of a human speaking the random phrase requested of the user. The mobile device determines that providing the liveness indication increases the identity probability by 5%. Accordingly, the identity probability increases from 94% to 99%. The mobile device determines that the identity probability is now greater than 95%, and allows the user to withdraw $200.

In at least some of the foregoing examples, features have been disclosed which correspond to certainty requirements. In some examples, the certainty requirements may vary depending on one or more factors, such as location, time of day, number of recent attempts. For example, a certainty requirement for a bank withdrawal of a certain value may be higher at night, higher in countries which the user does not frequently visit, or higher as a result of several recent failed attempts. In some examples, a host of an access-controlled feature (for example, a bank affiliated with a mobile banking application) may modify certainty requirements. For example, a bank affiliated with a mobile banking application may raise certainty requirements in response to a recent security breach.

In light of the foregoing, an authentication system has been disclosed. Embodiments disclosed herein enable authentication to be performed based on varying types of authentication information. In at least one embodiment, a level of inconvenience to a user of providing types of authentication information is proportionally related to the criticality of an access-controlled function, such that the user is nominally inconvenienced to access low-criticality functions, and most inconvenienced only to access highest-criticality functions.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

For example, although the foregoing discussion describes active information as being analyzed prior to liveness information, in alternate embodiments liveness information may be analyzed prior to active information. For example, a mobile device may determine that an identity probability based solely on passive information may be sufficiently increased to enable access to an access-controlled function by verifying the user's heartbeat. The mobile device may verify the user's heartbeat to verify the liveness of the user without prompting the user to provide any information, and may allow the user to access the access-controlled function.

What is claimed is:

1. A method of authorizing access to access-controlled environments, the method comprising:
   receiving, by a computing device, passive user authentication information indicative of an identity of a user of the computing device;
   comparing, by the computing device, the passive user authentication information to a stored user identifier associated with the user;
   receiving, by the computing device, active user authentication information indicative of the identity of the user of the computing device;
   comparing, by the computing device, the active user authentication information to the stored user identifier associated with the user;
   generating a liveness evaluation of the user and validating of submission of the passive and active authentication information, wherein the liveness evaluation includes authentication information that validates capture of the passive and active sources of authentication information by a live user, wherein generating the liveness evaluation includes an act of processing the authentication information that validates the capture of the passive and active user authentication information using a plurality of neural networks including at least a first neural network configured to process passive authentication information and a second neural network configured to process active authentication information, wherein the first and second neural networks are configured to process authentication information and generate a respective output probability that the passive authentication information and the active authentication information are actually obtained from the user;
   receiving, by the computing device, a request from the user to execute an access-controlled function; and
   granting, by the computing device, the request from the user responsive to determining that a user identity probability satisfies a first identity probability threshold associated with the access-controlled function based on, at least in part, the active and passive user authentication information and the liveness evaluation.

2. The method of claim 1, wherein the passive authentication information includes user behavior authentication information.

3. The method of claim 2, wherein receiving the passive user behavior authentication information is performed without prompting the user to provide the user behavior authentication information.

4. The method of claim 1, wherein the first neural network configured to process passive authentication information and the second neural network configured to process active authentication information are configured as a consolidated neural network.

5. The method of claim 1, further comprising:
   receiving, by the computing device, a second request from the user to execute a second access-controlled function;
   prompting, by the computing device, the user to provide at least one biometric input responsive to determining that the user identity probability does not satisfy a second identity probability threshold associated with the second access-controlled function;
   receiving, by the computing device, the at least one biometric input from the user;
   comparing, by the computing device, the at least one biometric input to a user profile;
   calculating, by the computing device, a second user identity probability based on the comparison of the at least one biometric input to the user profile;
   adjusting, by the computing device, the user identity probability based on the second user identity probability; and
   granting, by the computing device, the second request from the user responsive to determining that the user identity probability satisfies the second identity probability threshold.

6. The method of claim 5, wherein the user profile includes an encrypted biometric value corresponding to the user, the encrypted biometric value being encrypted by a first encryption algorithm.

7. The method of claim 6, wherein comparing the at least one biometric input to the user profile includes:
   encrypting the at least one biometric input using the first encryption algorithm to generate at least one encrypted biometric input; and
   comparing the at least one encrypted biometric input to the encrypted biometric value.

8. The method of claim 5, further comprising:
   receiving, by the computing device, a third request from the user to execute a third access-controlled function;
   determining, by the computing device, that the user identity probability does not satisfy a third identity probability threshold associated with the third access-controlled function;
   receiving, by the computing device, a liveness indicator from the user;
   calculating, by the computing device, a third user identity probability based on the liveness indicator;
   adjusting, by the computing device, the user identity probability based on the third user identity probability; and granting, by the computing device, the third request from the user responsive to determining that the user identity probability satisfies the third identity probability threshold.

9. The method of claim 8, wherein generating the liveness evaluation indicator includes an act of determining a probability that the user is a live human user.

10. The method of claim 9, wherein generating the liveness evaluation includes at least evaluation of one of an audio recording of the user speaking a phrase generated by the computing device or a video of the user performing a gesture generated by the computing device.

11. The method of claim 9, wherein receiving the liveness indicator includes receiving, passively by the computing device, one or more signals indicative of one or more vital signs of the user.

12. A system of authorizing access to access-controlled environments, the system comprising:
at least one processor operatively connected to a memory, the at least one processor configured to:
receive passive user authentication information indicative of an identity of a user of the computing device;
compare the passive user authentication information to a stored user identifier associated with the user;
receive active user authentication information indicative of the identity of the user of the computing device;
compare the active user authentication information to the stored user identifier associated with the user;
generate a liveness evaluation of the user and validate submission of the passive and active user authentication information, wherein the liveness evaluation is based on authentication information that validates capture of the passive and active sources of authentication information by a live user, wherein generation of the liveness evaluation includes operations executed by the at least one processor configured to validate the capture of the passive and active user authentication information using a plurality of neural networks including at least a first neural network configured to process passive authentication information and a second neural network configured to process active authentication information, wherein the first and second neural networks are configured to process the authentication information and generate a respective output probability that the passive user authentication information and the active user authentication information inputs are actually obtained from the user;
receive a request from the user to execute an access-controlled function; and
grant the request from the user responsive to a determination that a user identity probability satisfies a first identity probability threshold associated with the access-controlled function based on, at least in part, the active and passive authentication information and the liveness evaluation.

13. The system of claim 12, wherein the passive authentication information includes user behavior authentication information.

14. The system of claim 12, wherein passively receiving the user behavior authentication information is performed without prompting the user to provide the user behavior authentication information.

15. The system of claim 12, wherein the first neural network configured to process passive authentication information and the second neural network configured to process active authentication information are configured as a consolidated neural network.

16. The system of claim 12, wherein the at least one processor is further configured to:
receive a second request from the user to execute a second access-controlled function;
prompt the user to provide at least one biometric input responsive to determining that the user identity probability does not satisfy a second identity probability threshold associated with the second access-controlled function;
receive the at least one biometric input from the user;
compare the at least one biometric input to a user profile;
calculate a second user identity probability based on the comparison of the at least one biometric input to the user profile;
adjust the user identity probability based on the second user identity probability; and
grant the second request from the user responsive to a determination that the user identity probability satisfies the second identity probability threshold.

17. The system of claim 16, wherein the user profile includes an encrypted biometric value corresponding to the user, the encrypted biometric value being encrypted by a first encryption algorithm.

18. The system of claim 17, wherein the at least one processor is further configured to:
encrypt the at least one biometric input using the first encryption algorithm to generate at least one encrypted biometric input; and
compare the at least one encrypted biometric input to the encrypted biometric value.

19. The system of claim 16, wherein the at least one processor is further configured to:
receive a third request from the user to execute a third access-controlled function;
determine that the user identity probability does not satisfy a third identity probability threshold associated with the third access-controlled function;
receive a liveness indicator from the user;
calculate a third user identity probability based on the liveness indicator;
adjust the user identity probability based on the third user identity probability; and
grant the third request from the user responsive to determining that the user identity probability satisfies the third identity probability threshold.

20. The system of claim 19 wherein the at least one processor is further configured to: determine a probability that the user is a live human user based on, at least in part, generation of the liveness evaluation.

21. The system of claim 20, wherein generation of the liveness evaluation includes at least evaluation of one of an audio recording of the user speaking a phrase generated by the computing device or a video of the user performing a gesture generated by the computing device.

22. The system of claim 20, wherein the at least one processor is further configured to: receive passively one or more signals indicative of one or more vital signs of the user.

* * * * *